(12) United States Patent
Takamoto et al.

(10) Patent No.: US 9,229,712 B2
(45) Date of Patent: Jan. 5, 2016

(54) BICYCLE COMPONENT CONTROL APPARATUS

(71) Applicant: Shimano Inc., Sakai, Osaka (JP)

(72) Inventors: Ryuichiro Takamoto, Osaka (JP); Mao Kuroda, Osaka (JP)

(73) Assignee: Shimano Inc., Osaka (JP)

( * ) Notice: Subject to any disclaimer, the term of this patent is extended or adjusted under 35 U.S.C. 154(b) by 80 days.

(21) Appl. No.: 14/022,457

(22) Filed: Sep. 10, 2013

(65) Prior Publication Data
US 2015/0073656 A1   Mar. 12, 2015

(51) Int. Cl.
| | | |
|---|---|---|
| *G06F 9/02* | (2006.01) | |
| *F16H 59/02* | (2006.01) | |
| *B62J 1/06* | (2006.01) | |
| *B62K 25/04* | (2006.01) | |
| *B62M 25/08* | (2006.01) | |
| *B62J 99/00* | (2009.01) | |

(52) U.S. Cl.
CPC ... *G06F 9/02* (2013.01); *B62J 1/06* (2013.01); *B62K 25/04* (2013.01); *B62M 25/08* (2013.01); *F16H 59/02* (2013.01); *B62J 2099/0026* (2013.01); *B62K 2025/044* (2013.01)

(58) Field of Classification Search
CPC .......... F16H 59/02; G06F 9/02; B62M 25/08; B62K 25/04; B62K 2025/044; B62J 1/06; B62J 2099/0026
See application file for complete search history.

(56) References Cited

U.S. PATENT DOCUMENTS

| | | | |
|---|---|---|---|
| 7,900,946 B2 | 3/2011 | Hara et al. | |
| 7,902,967 B2 | 3/2011 | Takebayashi | |
| 2012/0253600 A1 | 10/2012 | Ichida et al. | |
| 2014/0214285 A1* | 7/2014 | Wesling .......................... 701/51 |

FOREIGN PATENT DOCUMENTS

| | | |
|---|---|---|
| DE | 603 02 782 T2 | 7/2006 |
| DE | 20 2014 101 791 U1 | 6/2014 |

* cited by examiner

*Primary Examiner* — John Q Nguyen
*Assistant Examiner* — Michael Kerrigan
(74) *Attorney, Agent, or Firm* — Global IP Counselors

(57) ABSTRACT

A bicycle component control apparatus is basically provided with a communication interface and a controller. The communication interface is configured to communicate with at least one electric bicycle component and at least one manually operated input member. The controller is electrically coupled to the communication interface, and programmed to control the at least one electric bicycle component based on operation of the at least one manually operated input member. The controller is programmed to decide an operation mode of the at least one electric bicycle component differently based on a number of manually operated input member coupled to the controller via the communication interface.

17 Claims, 23 Drawing Sheets

BICYCLE COMPONENT CONTROL APPARATUS

BACKGROUND

1. Field of the Invention

This invention generally relates to a bicycle component control apparatus. More specifically, the present invention relates to a bicycle component control apparatus that changes an operation mode of at least one bicycle component based on a number of manually operated input members that are operatively coupled thereto.

2. Background Information

In recent years, some bicycles are provided with electric bicycle components. Examples of some these electric bicycle components include suspensions, transmissions (e.g., derailleurs, internally geared hubs, etc.) and seatposts. Typically, bicycles equipped with electric bicycle components are also provided a manually operated input member for each of the electric bicycle components. A bicycle component control apparatus has been proposed that controls an operation of one or more electric bicycle components, e.g. a derailleur, a suspension and an adjustable seatpost, based on an electrical connecting state between a controller and a manually operated input member. An example of such a bicycle component control apparatus is disclosed in U.S. Patent Application Publication No. 2012-0253600, which is assigned to Shimano Inc.

SUMMARY

Generally, the present disclosure is directed to various features of a bicycle component control apparatus that controls at least one bicycle component. More specifically, this present disclosure is directed to a bicycle component control apparatus that changes an operation mode of at least one bicycle component based on a number of manually operated input members that are operatively coupled thereto.

In view of the state of the known technology and in accordance with a first aspect of the present disclosure, a bicycle component control apparatus is provided that basically comprises a communication interface and a controller. The communication interface is configured to communicate with at least one electric bicycle component and at least one manually operated input member. The controller is electrically coupled to the communication interface, and programmed to control the at least one electric bicycle component based on operation of the at least one manually operated input member. The controller is programmed to decide an operation mode of the at least one electric bicycle component differently based on a number of manually operated input member coupled to the controller via the communication interface.

In accordance with a second aspect of the present invention, the bicycle component control apparatus according to the first aspect is configured so that the controller is programmed to control the operation of at least one transmission as one of the at least one electric bicycle component.

In accordance with a third aspect of the present invention, the bicycle component control apparatus according to the second aspect is configured so that the controller is programmed to control a front transmission of the at least one transmission based on an input from a first manually operated input member of the at least one manually operated input member and to control a rear transmission of the at least one transmission based on an input from a second manually operated input member of the at least one manually operated input member, while the first and second manually operated input members are coupled to the controller via the communication interface. Also the controller is programmed to control the front and rear transmissions based on an input from one of the first and second manually operated input members while only the one of the first and second manually operated input members is coupled to the controller via the communication interface.

In accordance with a fourth aspect of the present invention, the bicycle component control apparatus according to the second aspect is configured so that the controller is programmed to control the at least one transmission based on inputs from first and second manually operated input members of the at least one manually operated input member, while the first and second manually operated input members are coupled to the controller via the communication interface. Also the controller is programmed to control the at least one transmission based on an input from one of the first and second manually operated input members while only the one of the first and second manually operated input members is coupled to the controller via the communication interface.

In accordance with a fifth aspect of the present invention, the bicycle component control apparatus according to the first aspect is configured so that the controller is programmed to control the operation of at least one suspension as one of the at least one electric bicycle component.

In accordance with a sixth aspect of the present invention, the bicycle component control apparatus according to the fifth aspect is configured so that the controller is programmed to control a front suspension of the at least one suspension based on an input from a first manually operated input member of the at least one manually operated input member, and to control a rear suspension of the at least one suspension based on an input from a second manually operated input member of the at least one manually operated input member, while the first and second manually operated input members are coupled to the controller via the communication interface. Also the controller is programmed to control the front and rear suspensions based on an input from one of the first and second manually operated input members while only the one of the first and second manually operated input members is coupled to the controller via the communication interface.

In accordance with a seventh aspect of the present invention, the bicycle component control apparatus according to the fifth aspect is configured so that the controller is programmed to control the at least one suspension based on inputs from first and second manually operated input members of the at least one manually operated input member, while the first and second manually operated input members are coupled to the controller via the communication interface. Also the controller is programmed to control the at least one suspension based on an input from one of the first and second manually operated input members while only the one of the first and second manually operated input members is coupled to the controller via the communication interface.

In accordance with an eighth aspect of the present invention, the bicycle component control apparatus according to the first aspect is configured so that the controller is programmed to control the operation of an adjustable seatpost as one of the at least one electric bicycle component.

In accordance with a ninth aspect of the present invention, the bicycle component control apparatus according to the eighth aspect is configured so that the controller is programmed to control the adjustable seatpost based on inputs from first and second manually operated input members of the at least one manually operated input member, while the first and second manually operated input members are coupled to the controller via the communication interface.

Also the controller is programmed to control the adjustable seatpost based on an input from one of the first and second manually operated input members while only the one of the first and second manually operated input members is coupled to the controller via the communication interface.

In accordance with a tenth aspect of the present invention, the bicycle component control apparatus according to the first aspect is configured so that the controller is programmed to control a first electric bicycle component of the at least one electric bicycle component based on an input from a first manually operated input member of the at least one manually operated input member, and to control a second electric bicycle component of the at least one electric bicycle component based on an input from a second manually operated input member of the at least one manually operated input member, while the first and second manually operated input members are coupled to the controller via the communication interface. Also the controller is programmed to control the first and second electric bicycle components based on an input from one of the first and second manually operated input members when only the one of the first and second manually operated input members is coupled to the controller via the communication interface.

In accordance with an eleventh aspect of the present invention, the bicycle component control apparatus according to the tenth aspect is configured so that the controller is programmed to control the operation of a seatpost as the first electric bicycle component, and to control the operation of at least one suspension as the second electric bicycle component.

In accordance with a twelfth aspect of the present invention, the bicycle component control apparatus according to the first aspect is configured so that the communication interface is configured to be electrically connected by an electric wire to the at least one manually operated input member.

In accordance with a thirteenth aspect of the present invention, the bicycle component control apparatus according to the twelfth aspect is configured so that the controller is configured to receive an input signal from the at least one manually operated input member via the communication interface by power line communication.

In accordance with a fourteenth aspect of the present invention, the bicycle component control apparatus according to the first aspect is configured so that the controller is configured to receive an input signal from the at least one manually operated input member via the communication interface by wireless communication.

In accordance with a fifteenth aspect of the present invention, the bicycle component control apparatus according to the first aspect is configured so that the controller is disposed on one of the at least one electric bicycle component.

In accordance with a sixteenth aspect of the present invention, the bicycle component control apparatus according to the first aspect is configured so that the controller is separate and remote from the at least one electric bicycle component.

In accordance with a seventeenth aspect of the present invention, a bicycle component control apparatus is provided that basically comprises at least one manually operated input member, at least one electric bicycle component, a communication interface and a controller. The communication interface is configured to communicate with the at least one electric bicycle component and the at least one manually operated input member. The controller is electrically coupled to the communication interface, and programmed to control the at least one electric bicycle component based on operation of the at least one manually operated input member. The controller is programmed to decide an operation mode of the at least one electric bicycle component differently based on a number of manually operated input member coupled to the controller via the communication interface.

Also other objects, features, aspects and advantages of the disclosed bicycle component control apparatus will become apparent to those skilled in the art from the following detailed description, which, taken in conjunction with the annexed drawings, discloses one embodiment of the bicycle component control apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
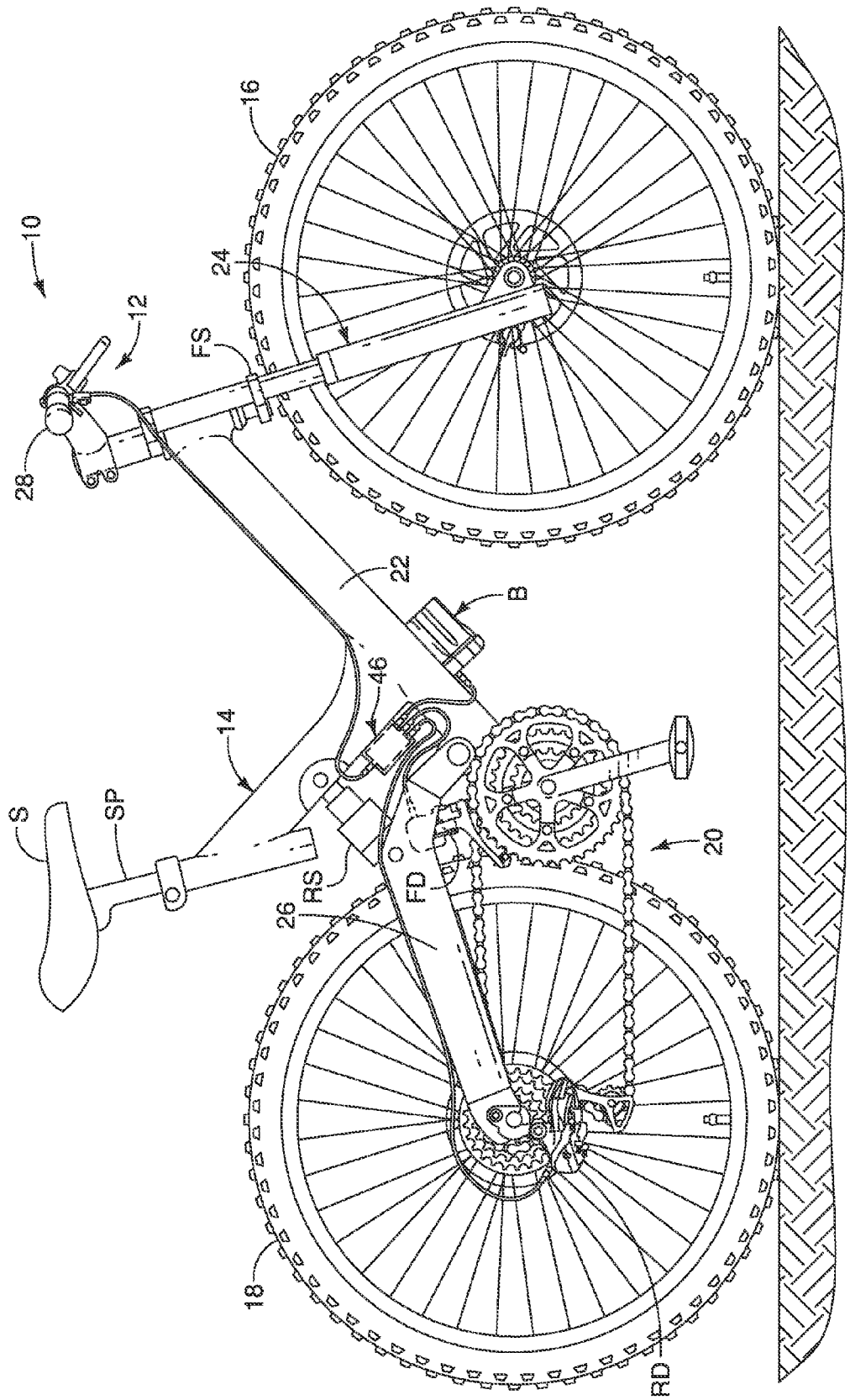
FIG. 1 is a side elevational view of a bicycle that is equipped with a bicycle component control apparatus in accordance with the illustrated embodiments.

Referring initially to FIG. 1, a bicycle 10 is illustrated that is equipped with a bicycle component control apparatus 12 for controlling the operations of various electric bicycle components in accordance with one illustrated embodiment. While the bicycle component control apparatus 12 is illustrated in connection with a mountain bike, the bicycle component control apparatus 12 can be used with other types of bicycle 10 as needed and/or desired. The bicycle 10 and its various parts are conventional, except for the bicycle component control apparatus 12 as discussed herein. Thus, the bicycle 10 and its various parts will not be discussed and/or illustrated in detail herein, except as needed to understand the bicycle component control apparatus 12.

As seen in FIG. 1, the bicycle 10 basically has a frame 14 having a front wheel 16, a rear wheel 18 and a drive train 20. The frame 14 includes a frame main body 22, a front fork 24, a rear swing arm 26 and a handlebar 28. The front fork 24 has a front suspension FS. A rear suspension RS is provided between the frame main body 22 and the rear swing arm 26. The frame main body 22 is also provided with a power supply B (e.g., a battery), an adjustable seatpost SP and a front derailleur FD (i.e., a front transmission). The rear swing arm 26 is provided with a rear derailleur RD (i.e., a rear transmission). A seat S is mounted to the adjustable seatpost SP, which vertically adjusts a position of the seat S with respect to the frame main body 2.

In the illustrated embodiment, the front derailleur FD, the rear derailleur RD, the front suspension FS, the rear suspension RS and the adjustable seatpost SP are examples of electric bicycle components that are adjustable between at least two operation modes. Thus, the front derailleur FD, the rear derailleur RD, the front suspension FS, the rear suspension RS and the adjustable seatpost SP will be collectively referred to as electric bicycle components FD, RD, FS, RS and SP for the sake of convenience. The electric bicycle components FD, RD, FS, RS and SP can be any type of electric bicycle components. Since electric bicycle components are well known in the bicycle field, the electric bicycle components FD, RD, FS, RS and SP will not be disclosed and/or illustrated in detail herein. Moreover, the bicycle component control apparatus 12 is not limited to the electric bicycle components FD, RD, FS, RS and SP and the particular arrangements disclosed herein. Rather, the bicycle component control apparatus 12 can have any combination of the electric bicycle components FD, RD, FS, RS and SP as well as other electric bicycle components (not shown) as needed and/or desired.

Figure 2:
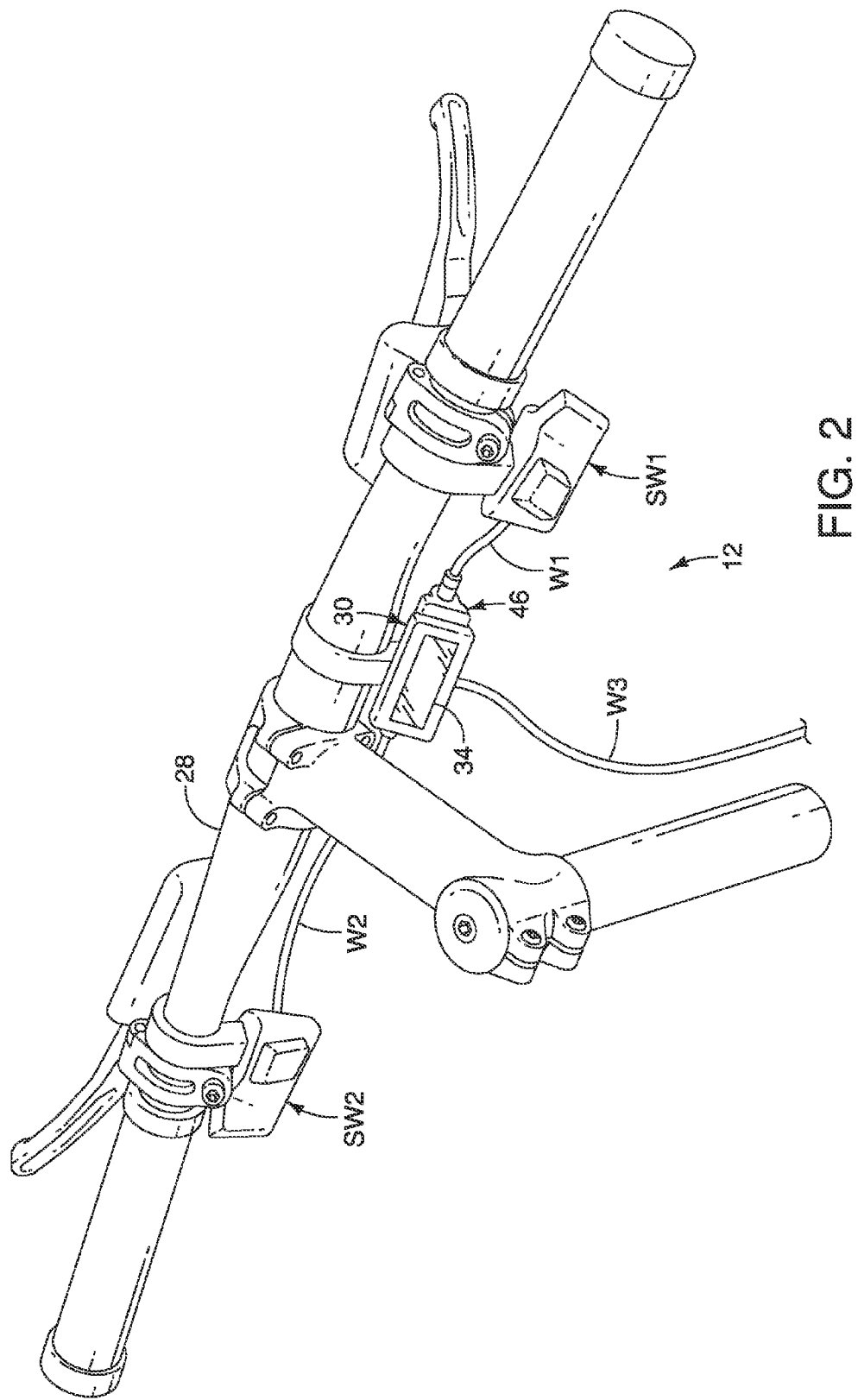
FIG. 2 is a perspective view of the handlebar area of the bicycle illustrated in FIG. 1, with a controller and two manually operated input members mounted to a straight type handlebar.

As seen in FIG. 2, the bicycle component control apparatus 12 includes a first manually operated input member SW1 and a second manually operated input member SW2. The first and second manually operated input members SW1 and SW2 can be used to control one or two of the electric bicycle components FD, RD, FS, RS and SP as discussed below.

In FIG. 2, the first manually operated input member SW1 is mounted to the handlebar 28 near the right handgrip, while the second manually operated input member SW2 is mounted to the handlebar 28 near the left handgrip. However, the first and second manually operated input members SW1 and SW2 can be mounted at other locations as needed and/or desired. Also, while the first and second manually operated input members SW1 and SW2 are illustrated with a single user operated push-button, it will be apparent from those skilled in the bicycle field that the first and second manually operated input members SW1 and SW2 can have other configurations. For example, the first and second manually operated input members SW1 and SW2 can each have two or more buttons, one or levers, a joy stick, etc. For the sake of simplicity, each of the first and second manually operated input members SW1 and SW2 has a single user operated push-button that can be pushed in a variety of ways (e.g., a short push, a long push, multiple pushes, etc.) to control one or two of the electric bicycle components FD, RD, FS, RS and SP as discussed below.

As seen in FIG. 2, the bicycle component control apparatus 12 includes a controller 30 that is programmed to selectively control one or two of the electric bicycle components FD, RD, FS, RS and SP in response to the operation of one or both of the first and second manually operated input members SW1 and SW2 as explained below. More specifically, the controller 30 is programmed to selectively control one or two electric bicycle components based on the number of manually operated input members that are operatively connected to the controller 30 such that the control of the electric bicycle component(s) is different depending on the number of manually operated input members that are operatively connected to the controller 30. In the first embodiment, the controller 30 selectively outputs a control parameter to the electric bicycle component(s) being controlled for selectively controlling an operating state of the electric bicycle component(s), as discussed below.

In the first embodiment, the controller 30 is separate and remote from the electric bicycle component(s) (e.g., one or more of the electric bicycle components FD, RD, FS, RS and SP) of the bicycle component control apparatus 12. As seen in FIG. 2, the controller 30 is preferably mounted on the handlebar 28 of the bicycle 10. However, alternatively, the controller 30 can be disposed on the electric bicycle component(s) (e.g., one or more of the electric bicycle components FD, RD, FS, RS and SP) or at other locations on the bicycle 10. In other words, the controller 30 can be either a separate unit from the electric bicycle components or an integrated part of one of the electric bicycle components.

In the first embodiment, only one or two of the electric bicycle components FD, RD, FS, RS and SP can be electrically connected to the controller 30 at one time. In other words, the controller 30 of the first embodiment only controls at most two of the electric bicycle components FD, RD, FS, RS and SP without having to be reconfigured. For, example, the front and rear derailleurs FD and RD can be electrically connected to the controller 30 as seen in FIG. 1, while the remaining electric bicycle components FS, RS and SP are unconnected and cannot be adjusted by the rider using the first and second manually operated input members SW1 and SW2. In other words, the controller 30 is programmed to decide an operation mode of the at least one electric bicycle component differently based on a number of manually operated input member coupled to the controller 30 via the communication interface 32.

The operation modes of the controller 30 will now be brief discussed. FIGS. 3 to 14 illustrate twelve different configurations of the bicycle component control apparatus 12. The controller 30 includes a different program for each of the twelve different configurations. Basically, in accordance with the programs the controller 30 will operate the electric bicycle components FD, RD, FS, RS and SP that are connected thereto differently based on the number of manually operated input members and which of the electric bicycle components are communicating (i.e., operatively coupled) with the controller 30.

Generally in the case of changing speeds, for example, when both the first and second manually operated input members SW1 and SW2 are operatively coupled to the controller 30, the controller 30 controls the front derailleur FD based on inputs from the first manually operated input member SW1, and controls the rear derailleur RD based on inputs from the second manually operated input member SW2. Thus, the controller 30 has pre-stored a non-synchro-shift program that is used upon detecting only two the first and second manually operated input members SW1 and SW2 is operatively connected to the controller 30, and the electric bicycle components FD and RD are both operatively connected to the controller 30.

On the other hand, when only the first manually operated input member SW1 is operatively coupled to the controller 30, the controller 30 controls the front and rear derailleurs FD and RD based on inputs from the first manually operated input member SW1. More specifically, the controller 30 controls both the front and rear derailleurs FD and RD by a synchro-shift mode when, for example, only the first manually operated input member SW1 is operatively coupled to the controller 30. Thus, the controller 30 has pre-stored a synchro-shift program that is used upon detecting only one of the first and second manually operated input members SW and SW2 is operatively connected to the controller 30, and the electric bicycle components FD and RD are both operatively connected to the controller 30.

Also when only one of the front and rear derailleurs FD and RD is operatively coupled to the controller 30, the controller 30 can control that derailleur with one or both the first and second manually operated input members SW1 and SW2 depending on whether one or both of the first and second manually operated input members SW1 and SW2 operatively coupled to the controller 30. Thus, the controller 30 has pre-stored a single-input single shifter program and a dual-input single shifter program that are selectively used based on the number the input members operatively connected to the controller 30.

Generally in the case of changing the suspension, for example, the controller 30 includes four different programs for controlling a suspension system that includes the front and rear suspensions FS and RS. The front and rear suspensions FS and RS are controlled in a similar fashion to the front and rear derailleurs FD and RD as discussed above. Thus, the controller 30 has pre-stored a non-synchro-suspension program that is used upon detecting both of the first and second manually operated input members SW1 and SW2 are operatively connected to the controller 30, and the front and rear suspensions FS and RS are both operatively connected to the controller 30. The controller 30 has pre-stored a synchro-suspension program that is used upon detecting only one of the first and second manually operated input members SW1 and SW2 is operatively connected to the controller 30, and the front and rear suspensions FS and RS are both operatively connected to the controller 30.

Also when only one of the front and rear suspensions FS and RS is operatively coupled to the controller 30, the controller 30 can control that suspension with one or both the first and second manually operated input members SW1 and SW2 depending on whether one or both of the first and second manually operated input members SW1 and SW2 operatively coupled to the controller 30. Thus, the controller 30 has pre-stored a single-input single suspension program and a dual-input single suspension program that are selectively used based on the number the input members operatively connected to the controller 30.

Moreover, the controller 30 controls one of the front and rear suspensions FS and RS and the adjustable seatpost SP in a similar fashion to the front and rear derailleurs FD and RD as discussed above. Thus, for example, the controller 30 includes four different programs for controlling one of the front and rear suspensions FS and RS and the adjustable seatpost SP either alone or in coordination with the one of the front and rear suspensions FS and RS.

Thus, the controller 30 has pre-stored a non-synchro-seatpost-suspension program that is used upon detecting both of the first and second manually operated input members SW1 and SW2 are operatively connected to the controller 30, and the electric bicycle components SP and FS (or RS) are both operatively connected to the controller 30. The controller 30 also has pre-stored a synchro-seatpost-suspension program that is used upon detecting only one of the first and second manually operated input members SW1 and SW2 is operatively connected to the controller 30, and the electric bicycle components SP and FS (or RS) are both operatively connected to the controller 30. Also when only one of the electric bicycle components SP, FS or RS is operatively coupled to the controller 30, the controller 30 can control that electric bicycle component with either one or both the first and second manually operated input members SW1 and SW2 depending on whether one or both of the first and second manually operated input members SW1 and SW2 operatively coupled to the controller 30. Thus, the controller 30 has pre-stored a single-input single component program and a dual-input single component program that are selectively used based on the number the input members operatively connected to the controller 30.

As seen in FIG. 2, the bicycle component control apparatus 12 further includes a communication interface 32, which is preferably integrally formed with the controller 30. For example, the communication interface 32 is an integrated part of a printed circuit board of the controller 30 in the first embodiment. The communication interface 32 preferably includes a first electrical port P1, a second electrical port P2 and a third electrical port P3. The electrical ports P1 to P3 are preferably all plug-in ports. The first manually operated input member SW1 is electrically connected to the first electrical port P1 of the communication interface 32 by a first electric power line W1. The second manually operated input member SW2 is electrically connected to the second electrical port P2 of the communication interface 32 by a second electric power line W2. A third electric power line W3 is electrically connected to the third electrical port P3 of the communication interface 32 to electrically connect the power supply B and one or two of the electric bicycle components FD, RD, FS, RS and SP to the controller 30. Thus, basically, the communication interface 32 acts as an electrical connection part of the controller 30 in the first embodiment. However, the communication interface 32 can be replaced with or can include a wireless communication interface such that the controller 30 wirelessly communicates with one or both of the input members and/or one or more of the electric bicycle components.

Preferably, as seen in FIGS. 3 to 14, the first electric power line W1 is provided with a first electrical connector C1 that plugs into the communication interface 32. The other end of the first electric power line W1 can be either plugged into the first manually operated input member SW1 or non-detachably connected to the first manually operated input member SW1. Likewise, the second electric power line W2 is provided with a second electrical connector C2 that plugs into the communication interface 32. The other end of the second electric power line W2 can be either plugged into the second manually operated input member SW2 or non-detachably connected to the second manually operated input member SW2. In any case, the controller 30 is electrically coupled to the communication interface 32 for receiving signals from the first and second manually operated input members SW1 and SW2. The communication interface 32 is configured to communicate with at least one electric bicycle component (e.g., one or more of the electric bicycle components FD, RD, FS, RS and SP) and at least one manually operated input member (e.g., one or both of the first and second manually operated input members SW1 and SW2).

While the first and second manually operated input members SW1 and SW2 are detachably connected to the controller 30 via the communication interface 32, it will be apparent from this disclosure that one of the first and second manually operated input members SW1 and SW2 can be fixedly connected to the controller 30 via the communication interface 32 while the other of the first and second manually operated input members SW1 and SW2 can be detachably connected to the controller 30 via the communication interface 32. Thus, the bicycle component control apparatus 12 basically includes the controller 30 and the communication interface 32. Of course, the bicycle component control apparatus 12 can include the controller 30, the communication interface 32 and at least one of the manually operated input members SW1 and SW2. Moreover, the bicycle component control apparatus 12 can include the controller 30, the communication interface 32, at least one of the manually operated input members SW1 and SW2 and at least one of the electric bicycle components FD. RD, FS, RS and SP.

It will be apparent from this disclosure that the communication interface 32 can be configured to communicate with the manually operated input members SW1 and SW2 and the electric bicycle components FD, RD, FS, RS and SP using a wire and/or a wireless communication adapter as needed and/or desired. In other words, the communication interface 32 can include one or more plug-in connectors, one or more fixed connections and a wireless communication adapter, or any combination of these communication interfaces. For example, the communication interface 32 can be configured such that one manually operated input member is fixedly connected to the communication interface 32 and another manually operated input member is detachably connected to the communication interface 32. Alternatively, the manually operated input members are each detachably connected to the communication interface 32.

In the first embodiment, the communication interface 32 preferably includes a first electrical port P1, a second electrical port P2 and a third electrical port P3. The first electrical port P1 is configured as a plug-in port that detachably receives the first electrical connector C1. The first electrical port P1 is configured as a plug-in port that detachably receives the second electrical connector C1. The third electrical port P3 is configured as a plug-in port that detachably receives a third electrical connector C3 as discussed below. Thus, the communication interface 32 is configured to be electrically connected by an electric wire to at least one manually operated input member, and more preferably, to both of the manually operated input member in this first embodiment.

As seen in FIGS. 1 and 3 to 14, the power supply B (e.g., a battery as shown) of the bicycle component control apparatus 12 supplies electrical power to the controller 30 and the first and second manually operated input members SW1 and SW2. Also the power supply B supplies electrical power to one or two of the electric bicycle components FD, RD, FS, RS and SP depending on which ones of the electric bicycle components FD, RD, FS, RS and SP are connected to the bicycle component control apparatus 12. In other words, the power supply B constitutes an electrical energy storage device or storage element that serves as a power source for the electrical components of the bicycle 10. The power supply B is not limited to a battery as the power supply. Rather, for example, a generator by itself or a generator in conjunction with a battery can be used for the power supply of the controller 30 and the electric bicycle components FD, RD, FS, RS and SP. The battery of the power supply 25 can be, for example, a nickel hydrogen battery or a lithium ion battery. Preferably, the power supply B supplies a prescribed voltage V to the controller 30 and the electric bicycle components FD, RD, FS, RS and SP.

In FIG. 2, the controller 30 is electrically connected to the first manually operated input member SW1 via a first electric power line W1, and electrically connected to the second manually operated input member SW2 via a second electric power line W2. The bicycle component control apparatus 12 can include both of the first and second manually operated input members SW1 and SW2 as seen FIGS. 3, 5, 7, 9, 11 and 13, or can only include one of the first and second manually operated input members SW1 and SW2 as seen FIGS. 4, 6, 8, 10, 12 and 14, for example.

Each of the first and second manually operated input members SW1 and SW2 selectively outputs an input signal to the controller 30. In response to receiving the input signal(s), the controller 30 outputs a control signal to change a setting or operating state of one or two of the electric bicycle components FD, RD, FS, RS and SP that are in communication with the controller 30. The setting or operating state of one or two of the electric bicycle components FD, RD, FS, RS and SP is changes in accordance with a control parameter that is outputted by the controller 30, as discussed below. The term "signal" as used herein is not limited to an electrical signal, but includes other types of signals such as a command or a wireless transmission.

As explained below in more detail, the controller 30 is programmed to selectively change various setting or operating states of the electric bicycle components FD, RD, FS, RS and SP, which are connected to the controller 30, in response to a manual input from a rider using the first and second manually operated input members SW1 and SW2. Thus, the controller 30 selectively changes at least one electrically adjustable parameter of the electric bicycle components FD, RD, FS, RS and SP in accordance with pre-stored programs that selected based on whether one or both of the first and second manually operated input members SW1 and SW2 are operatively connected to the controller 30, and based on which ones of the electric bicycle components FD, RD, FS, RS and SP are operatively connected to the controller 30. As seen in FIGS. 2 to 14, the controller 30 is proved with a touch screen 34 for displaying the current operation mode as well as other information as needed and/or desired. The touch screen 34 can be used as an input device that the rider can use to change various settings of the operation modes of the first and second manually operated input members SW1 and SW2 and/or the electric bicycle components FD, RD, FS, RS and SP as needed and/or desired.

Various methods can be utilized for detecting whether one or both of the first and second manually operated input members SW and SW2 are operatively connected to the controller 30 and which one of the electric bicycle components FD, RD, FS, RS and SP are operatively connected to the controller 30. For example, each of the manually operated input members SW1 and SW2 and each of the electric bicycle components FD, RD, FS, RS and SP has unique identification information, which can be detected and processed by the controller 30 to determine the number of manually operated input members and which ones of the electric bicycle components are operatively connected to the controller 30. The unique identification information can be received by the controller 30 in a variety of ways. For example, the controller 30 receives the unique identification information by a dedicated signal wire, an electric power line using power line communication (PLC) technology and/or a wireless communication signal. Alternative embodiment, for example, the controller 30 has dedicated ports for each of the manually operated input members and for each of the electric bicycle components. The controller 30 decides the number of the manually operated input members based on which of the dedicated ports are active.

As mentioned above, the controller 30 is programmed to control one or two of the electric bicycle components FD. RD, FS, RS and SP based on operation of one or both of the first and second manually operated input members SW1 and SW2 depending on which electric bicycle component(s) and whether one or both manually operated input members are communicating with the controller 30. In other words, the controller 30 is programmed to control at least one electric bicycle component (e.g., one or more of the electric bicycle components FD, RD, FS, RS and SP) based on operation of at least one manually operated input member (e.g., one or both of the first and second manually operated input members SW1 and SW2). The controller 30 is programmed to control a first electric bicycle component of the at least one electric bicycle component based on an input from a first manually operated input member SW1 of the at least one manually operated input member, and to control a second electric bicycle component of the at least one electric bicycle component based on an input from the second manually operated input member SW2 of the at least one manually operated input member, while the first and second manually operated input members SW1 and SW2 are coupled to the controller 30 via the communication interface 32. The controller 30 is programmed to control the first and second electric bicycle components (e.g., two of the electric bicycle components FD, RD, FS, RS and SP) based on an input from one of the first and second manually operated input members when only the one of the first and second manually operated input members SW1 or SW2 is coupled to the controller 30 via the communication interface 32.

As seen in FIGS. 1 and 3 to 14, the bicycle component control apparatus 12 further includes an electrical wiring junction 46, which is used to selectively connect the power supply B and one or two of the electric bicycle components FD, RD, FS, RS and SP to the controller 30 via the communication interface 32. In particular, the electrical wiring junction 46 is electrically connected to the communication interface 32 via the third electric power line W3. Of course, it will be apparent from this disclosure that the electrical wiring junction 46 can be part of the communication interface 32, and can be integrated into the housing of the controller 30, if needed and/or desired.

In the first illustrated embodiment, the electrical wiring junction 46 is configured to transmit signals from one or two of the electric bicycle components FD, RD, FS, RS and SP. The electrical wiring junction 46 is configured to electrically connect the power supply B to the electric bicycle components FD, RD, FS, RS and SP and the first and second manually operated input members SW1 or SW2 that are electrically connected to the electrical wiring junction 46. Preferably, the third electric power line W3 is provided with a plug-in electrical connector C3 that plugs into the third electrical port P3 of the communication interface 32, and a plug-in electrical connector C4 that plugs into the electrical wiring junction 46. The third electric power line W3 transmits the signals to the controller 30 from each of the electric bicycle components that is connected to the electrical wiring junction 46. The third electric power line W3 also transmits the signals from the controller 30 to the electrical wiring junction 46 where the signals from the controller 30 are relayed to each of the electric bicycle components that is connected to the electrical wiring junction 46.

In the first illustrated embodiment, the electrical wiring junction 46 preferably has four female connectors or ports $P_M$, $P_B$, $P_{EC1}$ and $P_{EC2}$ for electrically connecting with the controller 30, the power supply B and two of the electric bicycle components FD, RD, FS, RS and SP thereto. Here, the ports $P_{EC1}$ and $P_{EC2}$ are used for selectively connecting two of the electric bicycle components FD, RD, FS, RS and SP to the electrical wiring junction 46 via fourth and fifth electric power lines W4 and W5. The fourth and fifth electric power lines W4 and W5 are interchangeable among the electric bicycle components FD, RD, FS, RS and SP such that anyone of the electric bicycle components FD, RD, FS, RS and SP can be used with either one of the fourth and fifth electric power lines W4 and W5. Moreover, the electric bicycle components FD, RD, FS, RS and SP can be electrically connected to the controller using either the port $P_{EC1}$ or the port $P_{EC2}$. The port $P_B$ is used for electrically connecting the power supply B to the electrical wiring junction 46 via a sixth electric power line W6 such that electrical power is supplied to the controller 30 and the electric bicycle component(s) connected to the electrical wiring junction 46 and the manually operated input members connected to the communication interface 32. The port $P_M$ is used for electrically connecting the electrical wiring junction 46 to the communication interface 32 via the third electric power line W3.

Now, various configurations of the first and second manually operated input members SW1 and SW2 and the electric bicycle components FD, RD, FS, RS and SP will be discussed with reference to FIGS. 3 to 14. Generally, in FIGS. 3 to 6, the controller 30 is programmed to control the operation of at least one transmission as one of the at least one electric bicycle component using either only one or both of the first and second manually operated input members SW1 and SW2. In FIGS. 7 to 10, the controller 30 is programmed to control the operation of at least one suspension as one of the at least one electric bicycle component using either only one or both of the first and second manually operated input members SW1 and SW2. In FIGS. 11 to 14, the controller 30 is programmed to control the operation of at least one of a seatpost and a suspension as one of the at least one electric bicycle component using either only one or both of the first and second manually operated input members SW1 and SW2.

Figure 3:
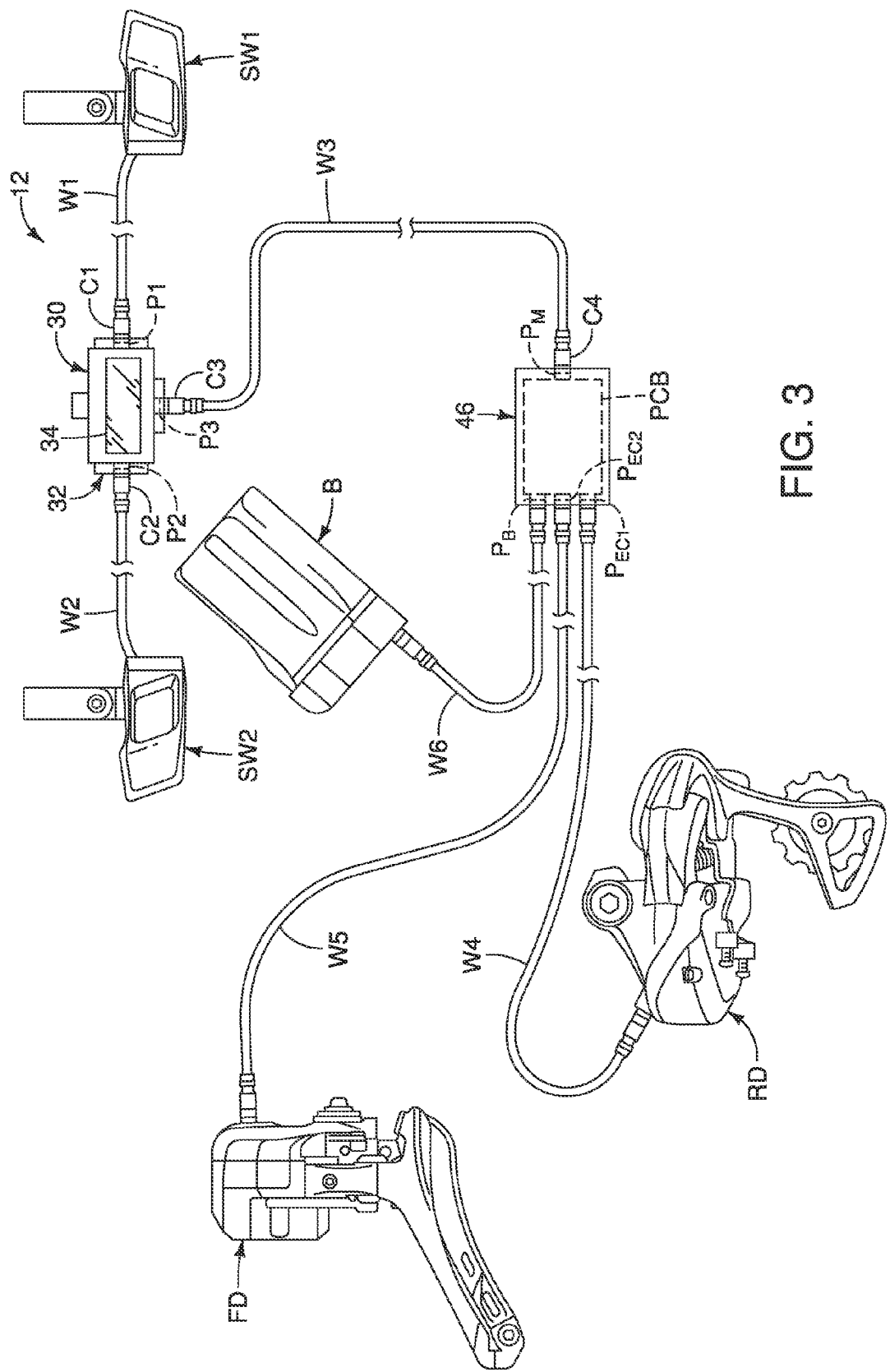
FIG. 3 is a diagrammatic view of a first configuration of the bicycle component control apparatus in which two manually operated input members electrically connected to the controller, which in turn is electrically connected to an electrical wiring junction that is electrically connected to a battery, a front derailleur (i.e., a front transmission) and a rear derailleur (i.e., a rear transmission)
Figure 4:
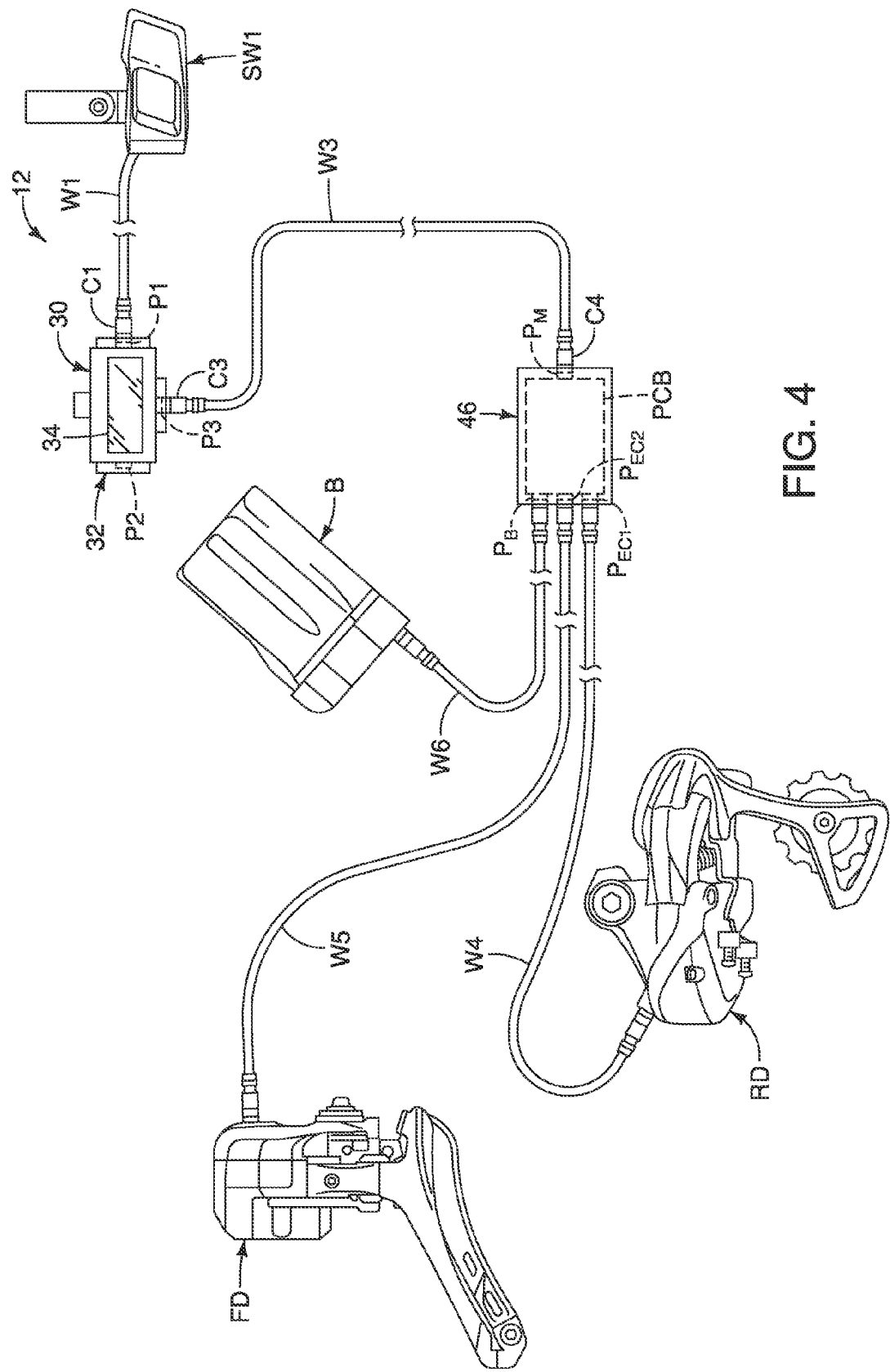
FIG. 4 is a diagrammatic view of a second configuration of the bicycle component control apparatus in which one manually operated input member electrically connected to the controller, which in turn is electrically connected to an electrical wiring junction that is electrically connected to a battery, a front derailleur (i.e., a front transmission) and a rear derailleur (i.e., a rear transmission)

Referring to FIGS. 3 and 4, one or both of the first and second manually operated input members SW1 and SW2 can be electrically connected to the controller 30 via the communication interface 32 to control the operations of the front derailleur FD (i.e., a front transmission) and the rear derailleur RD (i.e., a rear transmission). Thus, FIGS. 3 and 4 illustrate the configurations in which the controller 30 is programmed to control the operation of two transmissions (e.g., the front and rear derailleurs FD and RD) using either only one or both of the first and second manually operated input members SW1 and SW2. In the configuration of FIG. 3, the controller 30 is programmed to control a front transmission (e.g., the front derailleur FD) of the at least one transmission based on an input from the first manually operated input member SW1 of the at least one manually operated input member and to control a rear transmission (e.g., the rear derailleur RD) of the at least one transmission based on an input from the second manually operated input member SW2 of the at least one manually operated input member, while the first and second manually operated input members SW1 and SW2 are coupled to the controller 30 via the communication interface 32. In the configuration of FIG. 4, the controller 30 is programmed to control the front and rear transmissions (e.g., the front and rear derailleurs FD and RD) based on an input from one of the first and second manually operated input members (e.g., the first manually operated input member SW1) while only the one of the first and second manually operated input members (e.g., the first manually operated input member SW1) is coupled to the controller 30 via the communication interface 32.

Figure 5:
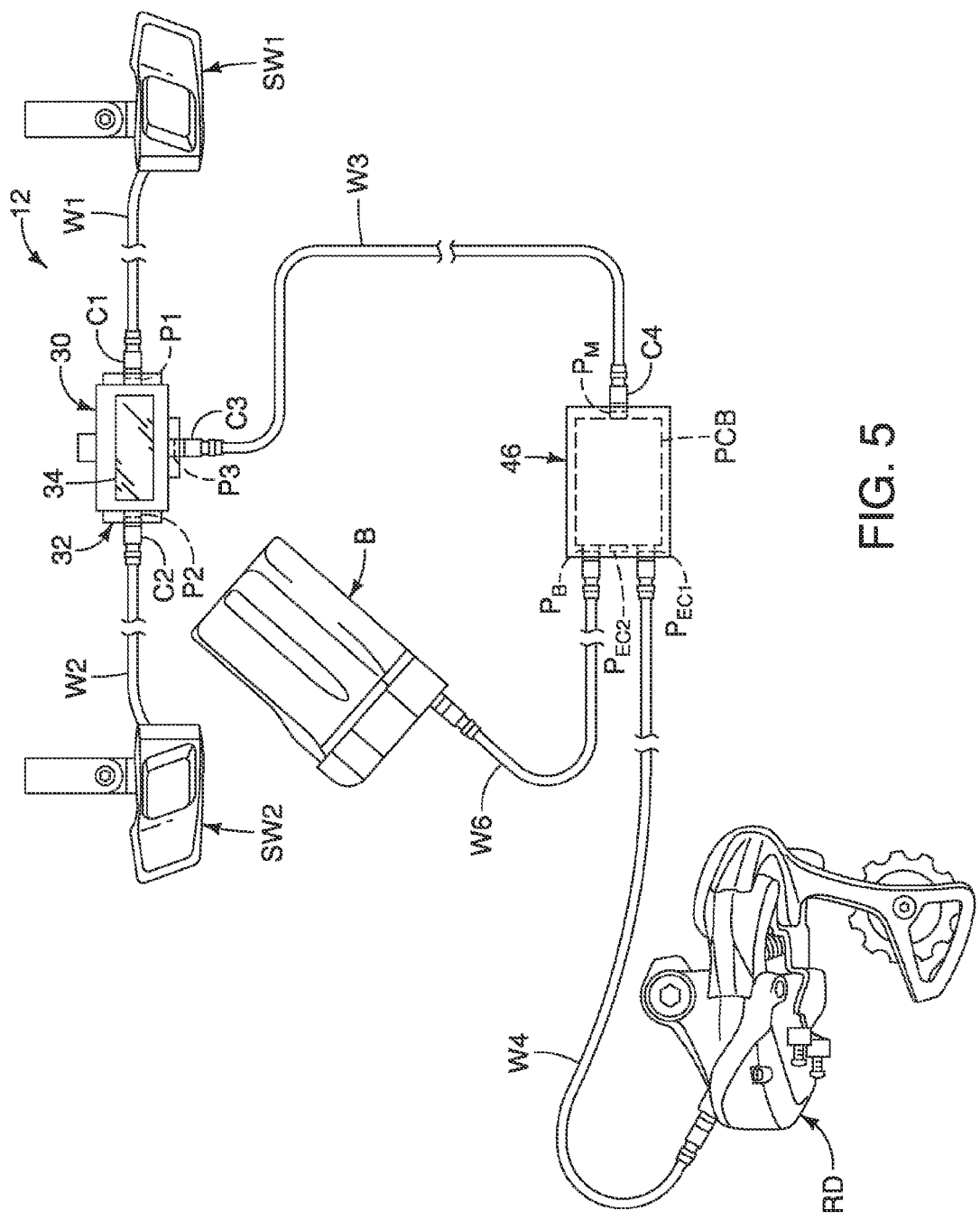
FIG. 5 is a diagrammatic view of a third configuration of the bicycle component control apparatus in which two manually operated input members electrically connected to the controller, which in turn is electrically connected to an electrical wiring junction that is electrically connected to a battery and a rear derailleur (i.e., a rear transmission)
Figure 6:
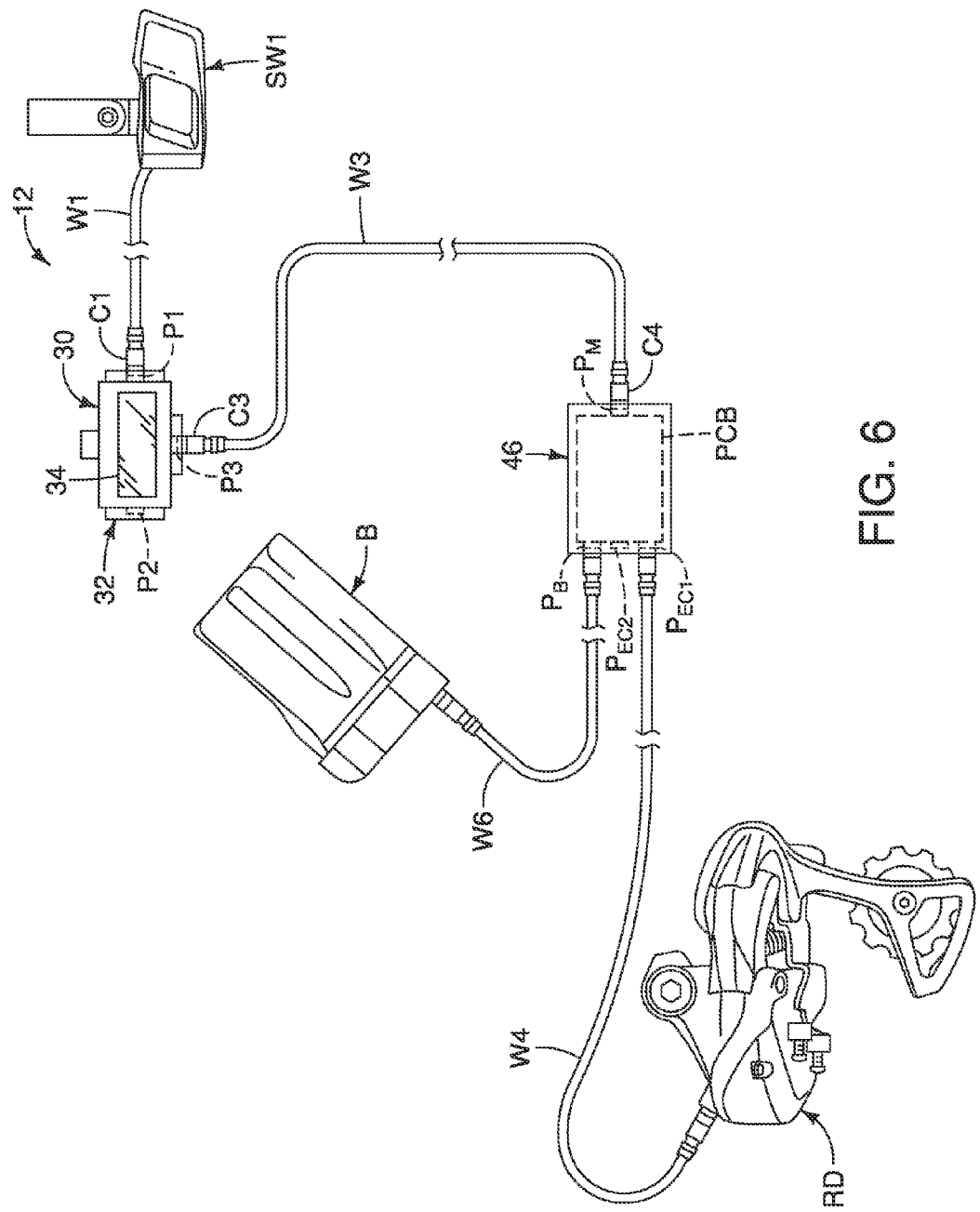
FIG. 6 is a diagrammatic view of a fourth configuration of the bicycle component control apparatus in which one manually operated input member electrically connected to the controller, which in turn is electrically connected to an electrical wiring junction that is electrically connected to a battery and a rear derailleur (i.e., a rear transmission)

Referring to FIGS. 5 and 6, one or both of the first and second manually operated input members SW1 and SW2 can be electrically connected to the controller 30 via the communication interface 32 to control the operation of the rear derailleur RD (i.e., a rear transmission). Alternatively, the front derailleur FD (i.e., a front transmission) can be plugged into the electrical wiring junction 46 instead of the rear derailleur RD in FIGS. 5 and 6 if needed and/or desired. Thus, FIGS. 5 and 6 illustrate the configurations in which the controller 30 is programmed to control the operation of only one transmission using either only one or both of the first and second manually operated input members SW1 and SW2. In the configuration of FIG. 5, the controller 30 is programmed to control the at least one transmission (e.g., the rear derailleur RD) based on inputs from the first and second manually operated input members SW1 and SW2 of the at least one manually operated input member, while the first and second manually operated input members SW1 and SW2 are coupled to the controller 30 via the communication interface 32. In the configuration of FIG. 6, the controller 30 is programmed to control the at least one transmission (e.g., the rear derailleur RD) based on an input from one of the first and second manually operated input members SW1 and SW2 while only the one of the first and second manually operated input members (e.g., the first manually operated input member SW1) is coupled to the controller 30 via the communication interface 32.

Figure 7:
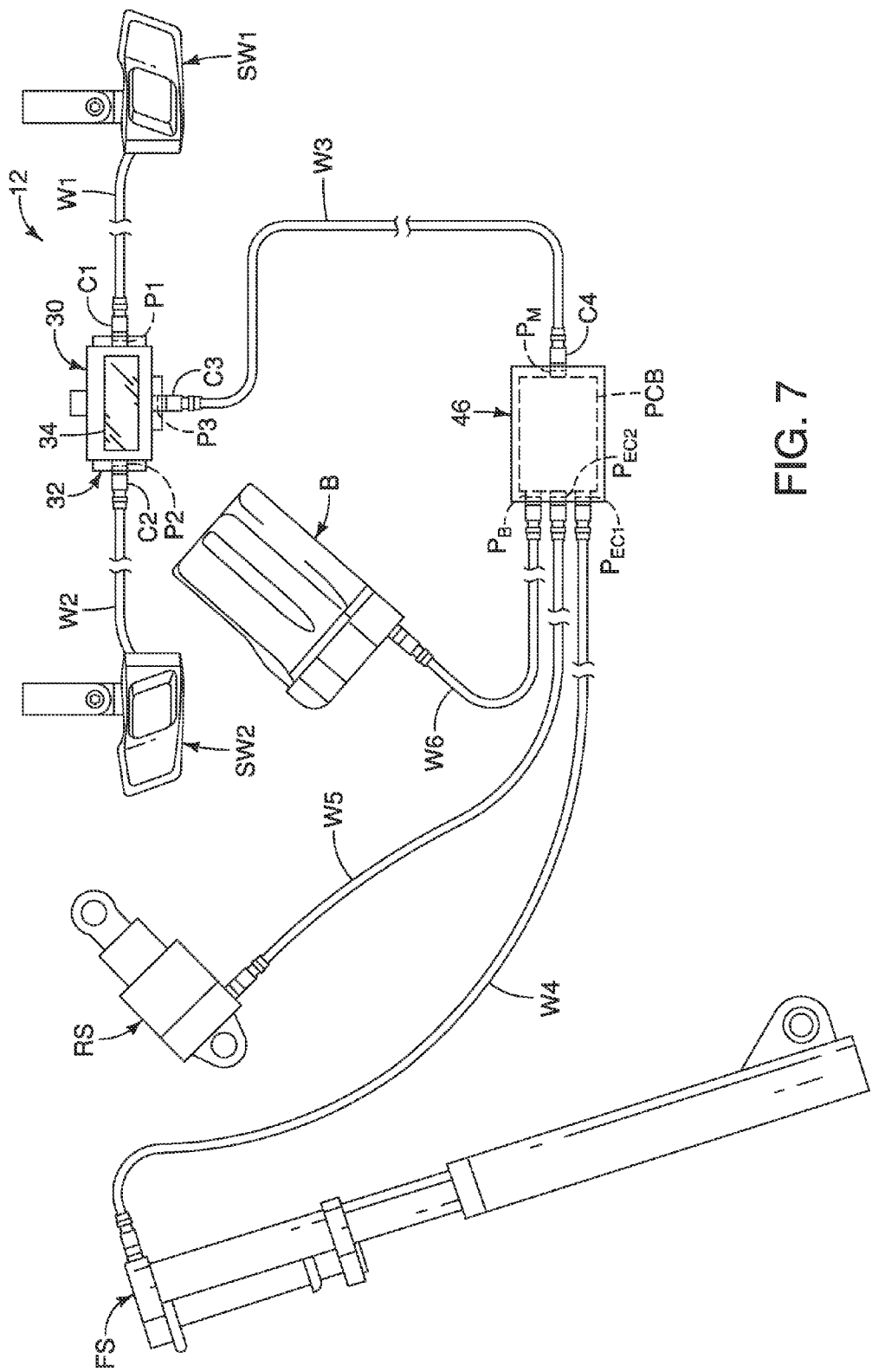
FIG. 7 is a diagrammatic view of a fifth configuration of the bicycle component control apparatus in which two manually operated input members electrically connected to the controller, which in turn is electrically connected to an electrical wiring junction that is electrically connected to a battery, a front suspension and a rear suspension.
Figure 8:
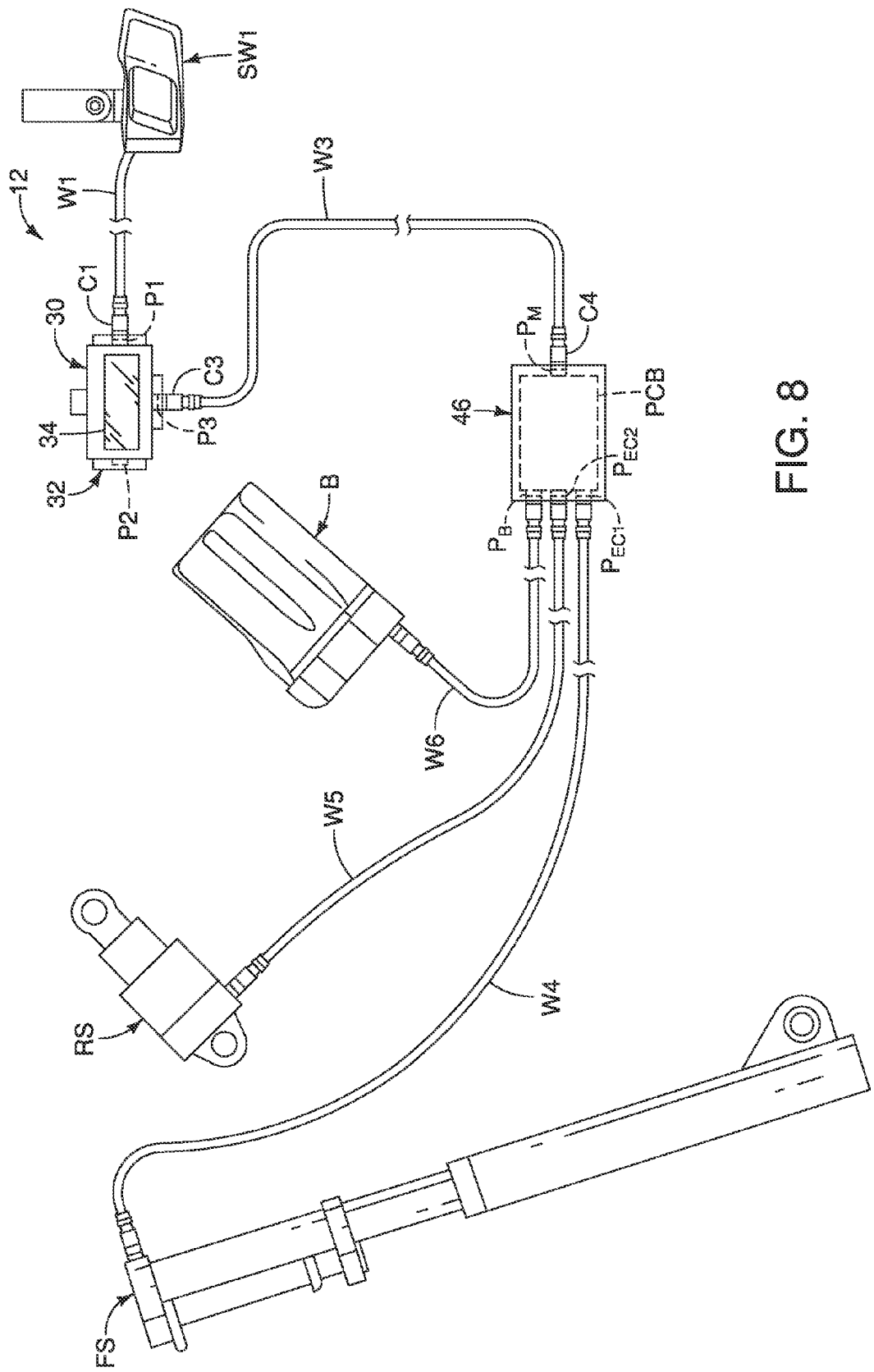
FIG. 8 is a diagrammatic view of a sixth configuration of the bicycle component control apparatus in which one manually operated input member electrically connected to the controller, which in turn is electrically connected to an electrical wiring junction that is electrically connected to a battery, a front suspension and a rear suspension.

As seen in FIGS. 7 and 8, one or both of the first and second manually operated input members SW1 and SW2 can be electrically connected to the controller 30 via the communication interface 32 to control the operations of the front suspension FS and the rear suspension RS. Thus, FIGS. 7 and 8 illustrate the configurations in which the controller 30 is programmed to control the operation of at least one suspension as one of the at least one electric bicycle component using either only one or both of the first and second manually operated input members SW1 and SW2. In the configuration of FIG. 7, the controller 30 is programmed to control the front suspension FS of the at least one suspension based on an input from the first manually operated input member SW1 of the at least one manually operated input member, and to control the rear suspension RS of the at least one suspension based on an input from the second manually operated input member SW2 of the at least one manually operated input member, while the first and second manually operated input members SW1 and SW2 are coupled to the controller 30 via the communication interface 32. In the configuration of FIG. 8, the controller 30 is programmed to control the front and rear suspensions FS and RS based on an input from one of the first and second manually operated input members (e.g., the first manually operated input member SW1) while only the one of the first and second manually operated input members (e.g., the first manually operated input member SW1) is coupled to the controller 30 via the communication interface 32.

Figure 9:
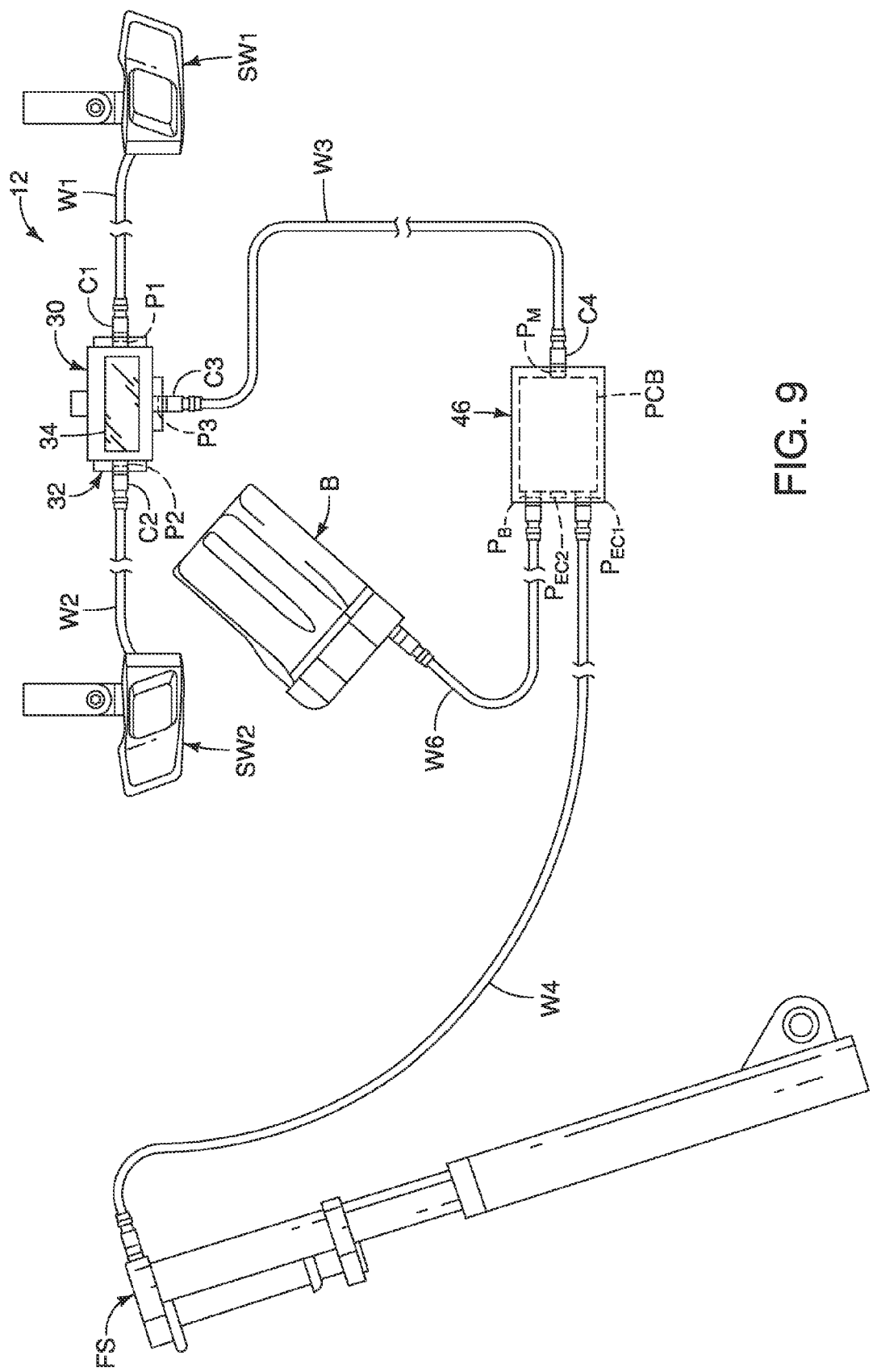
FIG. 9 is a diagrammatic view of a seventh configuration of the bicycle component control apparatus in which two manually operated input members electrically connected to the controller, which in turn is electrically connected to an electrical wiring junction that is electrically connected to a battery and a front suspension.
Figure 10:
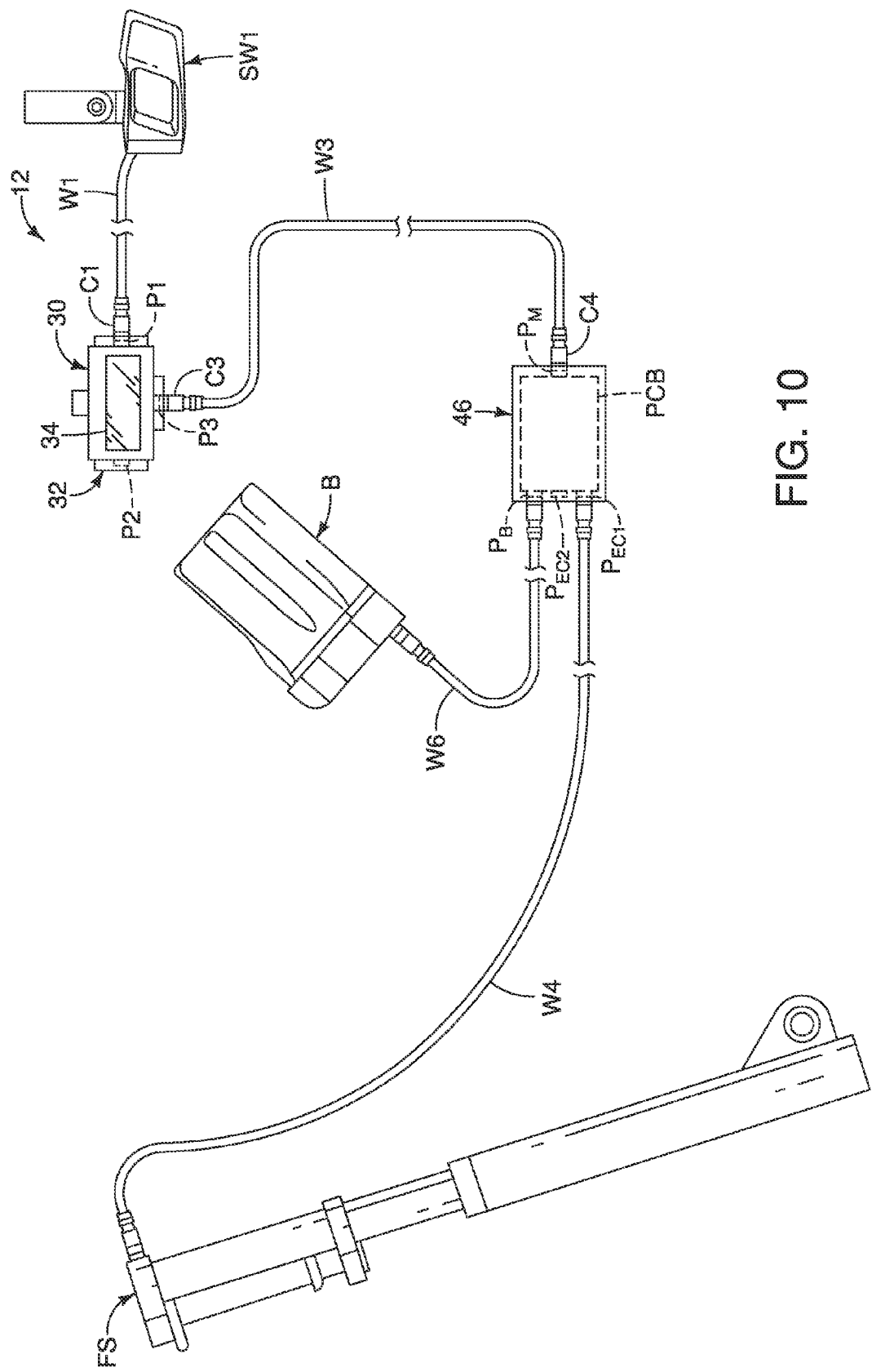
FIG. 10 is a diagrammatic view of an eighth configuration of the bicycle component control apparatus in which one manually operated input member electrically connected to the controller, which in turn is electrically connected to an electrical wiring junction that is electrically connected to a battery and a front suspension.

Referring to FIGS. 9 and 10, one or both of the first and second manually operated input members SW1 and SW2 can be electrically connected to the controller 30 via the communication interface 32 to control the operations of the front suspension FS. Alternatively, the rear suspension RS can be plugged into the electrical wiring junction 46 instead of the front suspension FS in FIGS. 9 and 10 if needed and/or desired. Thus, FIGS. 9 and 10 illustrate the configurations in which the controller 30 is programmed to control the operation of only one suspension using either only one or both of the first and second manually operated input members SW1 and SW2. In the configuration of FIG. 9, the controller 30 is programmed to control the at least one suspension (e.g., the front suspension FS) based on inputs from the first and second manually operated input members SW1 and SW2 of the at least one manually operated input member, while the first and second manually operated input members SW1 and SW2 are coupled to the controller 30 via the communication interface 32. In the configuration of FIG. 10, the controller 30 is programmed to control the at least one suspension (e.g., the front suspension FS) based on an input from one of the first and second manually operated input members (e.g., the first manually operated input member SW1) while only the one of the first and second manually operated input members (e.g., the first manually operated input member SW1) is coupled to the controller 30 via the communication interface 32.

Figure 11:
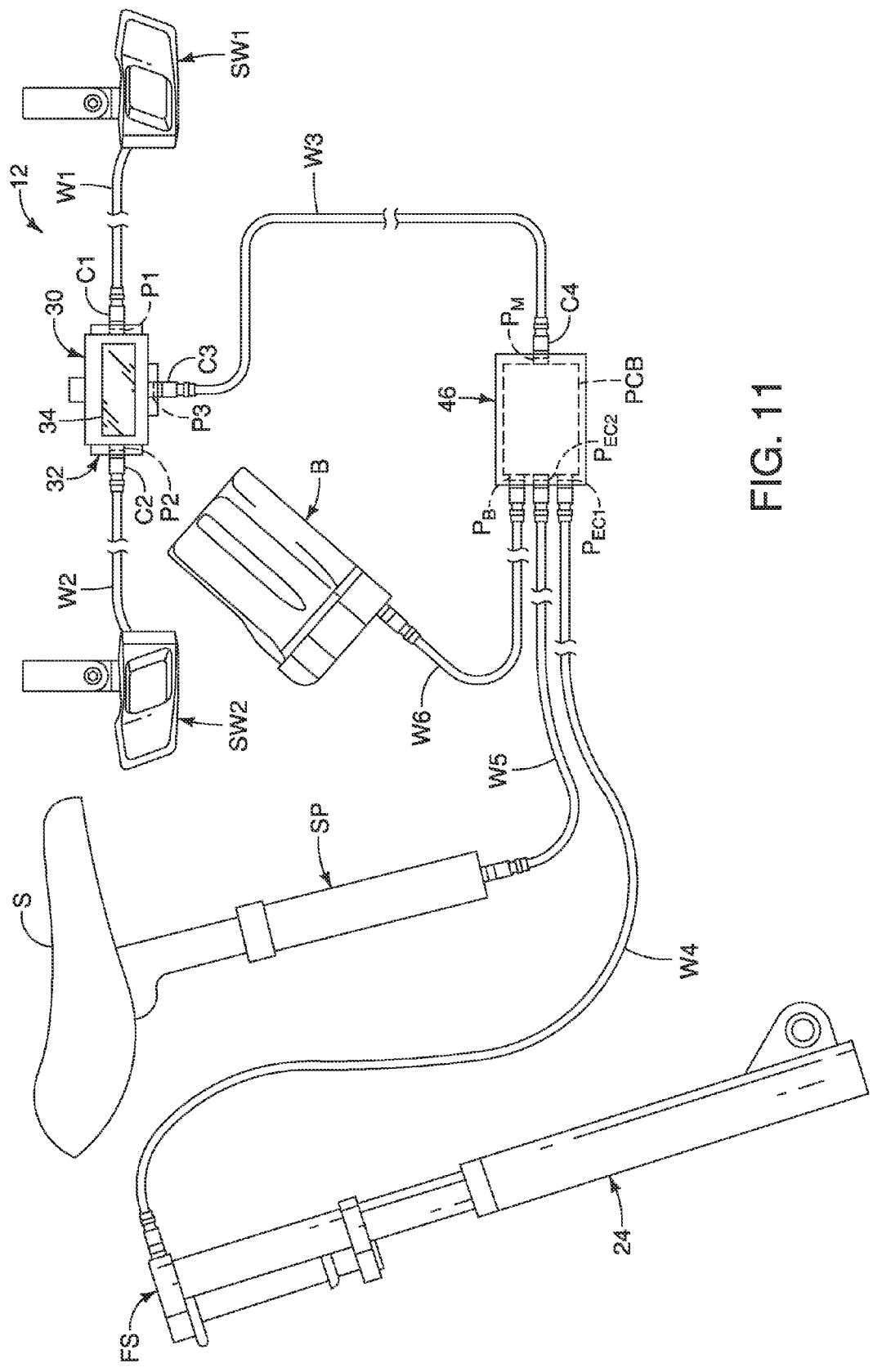
FIG. 11 is a diagrammatic view of a ninth configuration of the bicycle component control apparatus in which two manually operated input members electrically connected to the controller, which in turn is electrically connected to an electrical wiring junction that is electrically connected to a battery, a seatpost and a front suspension.
Figure 12:
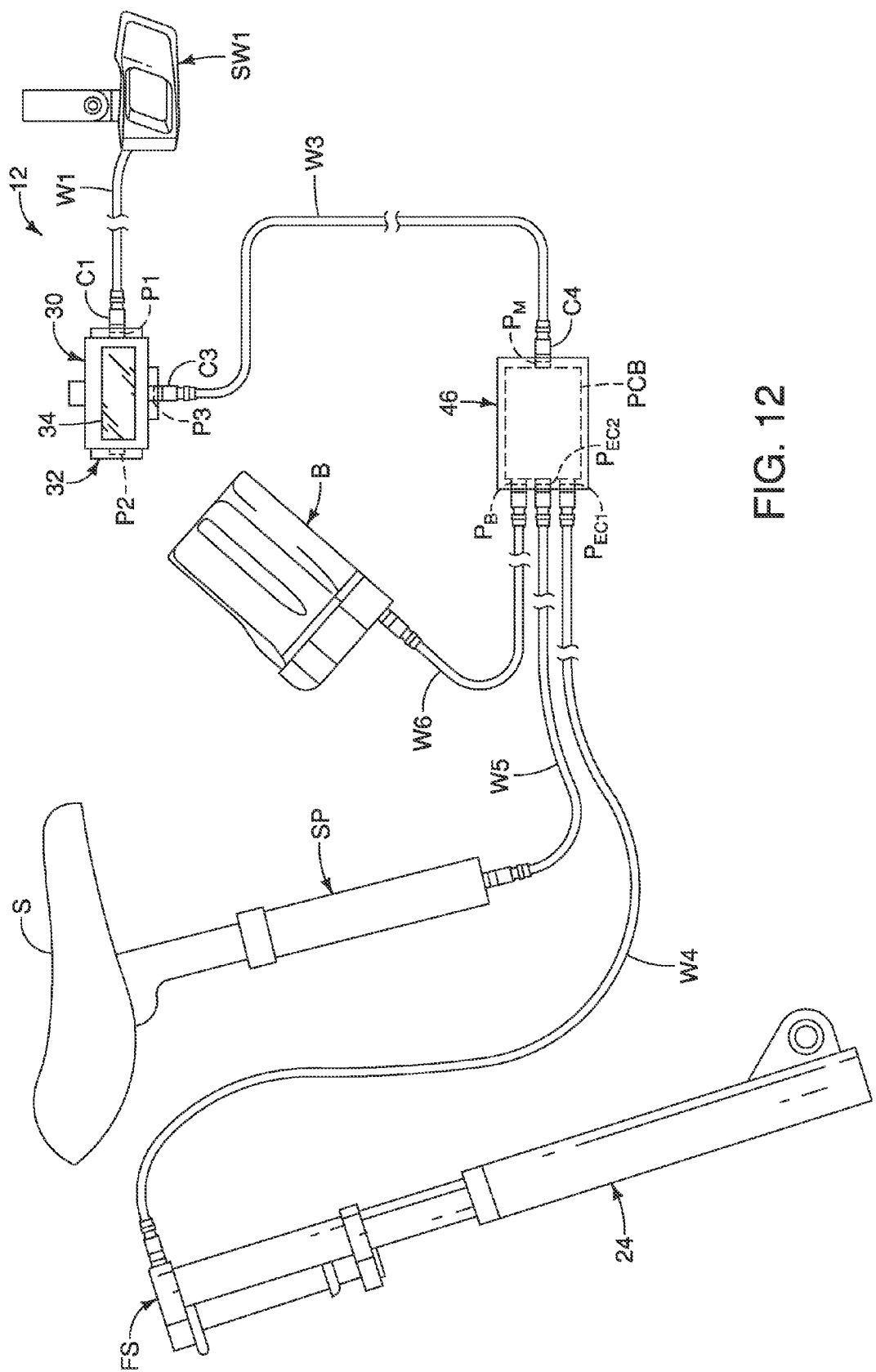
FIG. 12 is a diagrammatic view of a tenth configuration of the bicycle component control apparatus in which one manually operated input member electrically connected to the controller, which in turn is electrically connected to an electrical wiring junction that is electrically connected to a battery, a seatpost and a front suspension.

Referring to FIGS. 11 and 12, one or both of the first and second manually operated input members SW1 and SW2 can be electrically connected to the controller 30 via the communication interface 32 to control the operations of the adjustable seatpost SP and the front suspension FS. Thus, FIGS. 11 and 12 illustrate the configurations in which the controller 30 is programmed to control the operation of the adjustable seatpost SP as the first electric bicycle component, and to control the operation of at least one suspension (e.g., the front suspension FS) as the second electric bicycle component. The controller 30 is programmed to control the adjustable seatpost SP based on inputs from the first and second manually operated input members SW1 and SW2 of the at least one manually operated input member, while the first and second manually operated input members SW1 and SW2 are coupled to the controller 30 via the communication interface 32. The controller 30 is programmed to control the adjustable seatpost SP based on an input from one of the first and second manually operated input members (e.g., the first manually operated input member SW1) while only the one of the first and second manually operated input members (e.g., the first manually operated input member SW1) is coupled to the controller 30 via the communication interface 32.

Figure 13:
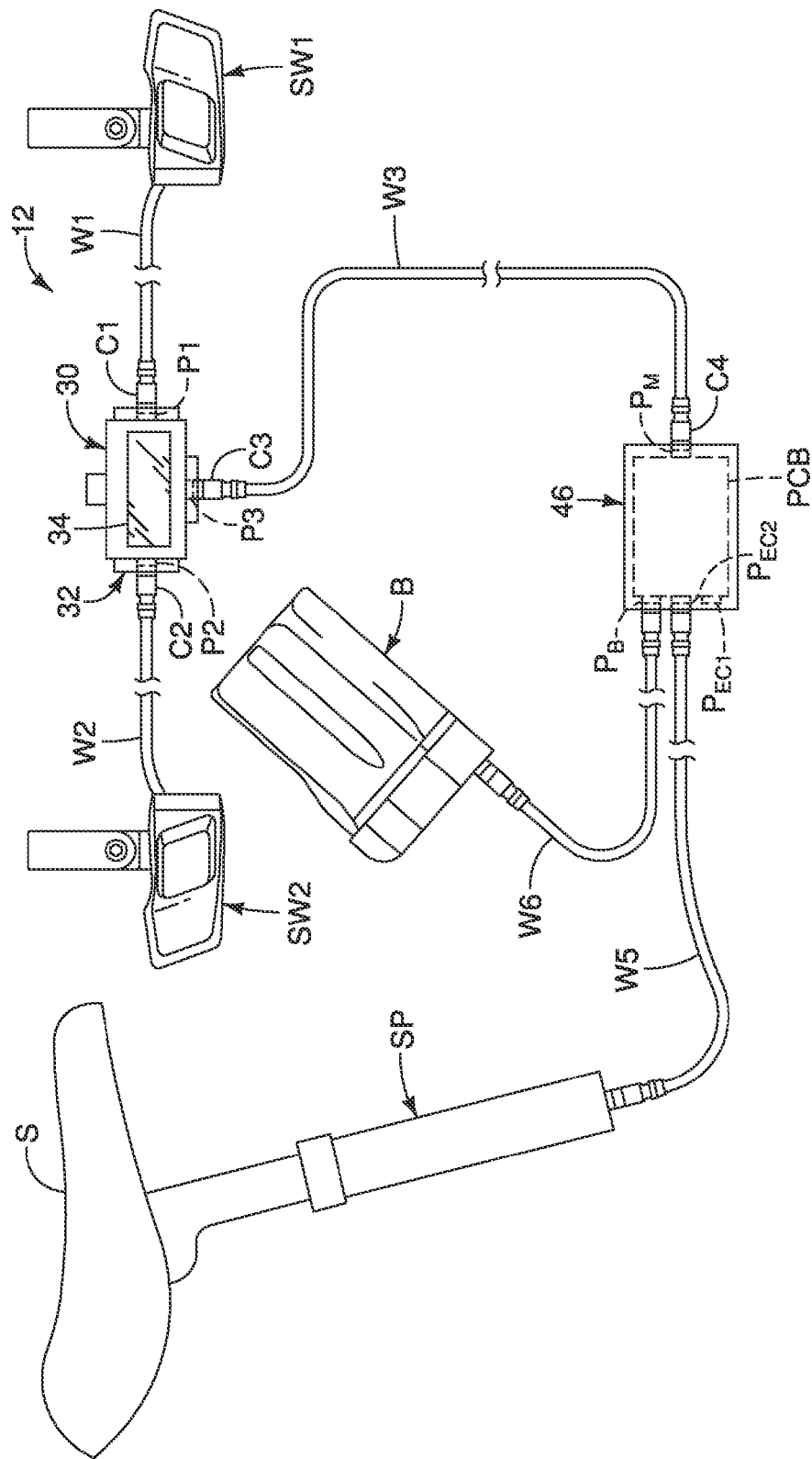
FIG. 13 is a diagrammatic view of an eleventh configuration of the bicycle component control apparatus in which two manually operated input members electrically connected to the controller, which in turn is electrically connected to an electrical wiring junction that is electrically connected to a battery and a seatpost.
Figure 14:
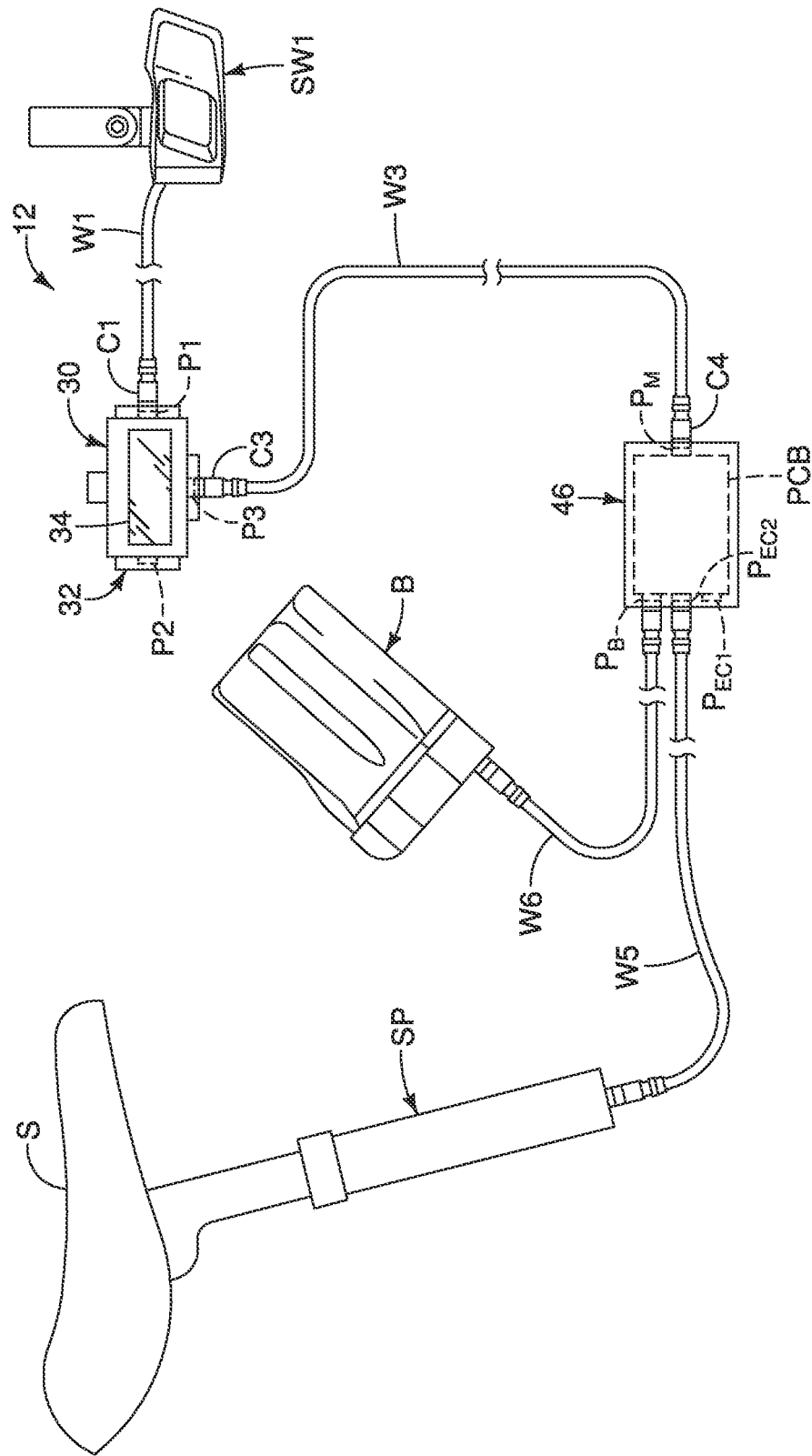
FIG. 14 is a diagrammatic view of a twelfth configuration of the bicycle component control apparatus in which one manually operated input member electrically connected to the controller, which in turn is electrically connected to an electrical wiring junction that is electrically connected to a battery and a seatpost.

Referring to FIGS. 13 and 14, one or both of the first and second manually operated input members SW1 and SW2 can be electrically connected to the controller 30 via the communication interface 32 to control the operations of the adjustable seatpost SP. Thus, FIGS. 11 and 12 illustrate the configurations in which the controller 30 is programmed to control only the operation of the adjustable seatpost SP as one of the at least one electric bicycle component using either only one or both of the first and second manually operated input members SW1 and SW2.

In the configuration of FIG. 11, the controller 30 is programmed to control the adjustable seatpost SP based on inputs from the first and second manually operated input members SW1 and SW2 of the at least one manually operated input member, while the first and second manually operated input members SW1 and SW2 are coupled to the controller 30 via the communication interface 32. In the configuration of FIG. 12, the controller 30 is programmed to control the adjustable seatpost SP based on an input from one of the first and second manually operated input members (e.g., the first manually operated input member SW1) while only the one of the first and second manually operated input members (e.g., the first manually operated input member SW1) is coupled to the controller 30 via the communication interface 32.

Figure 15:
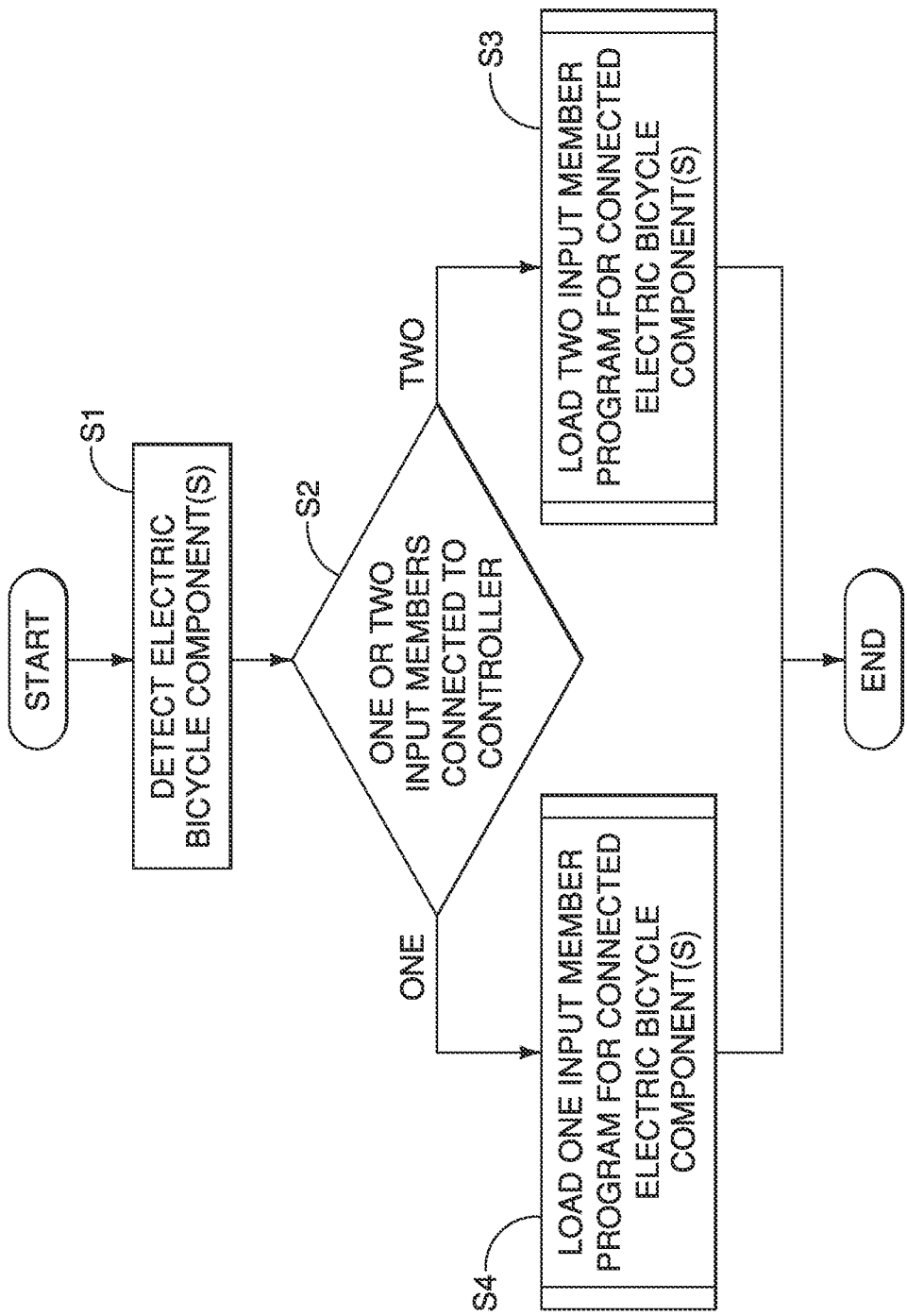
FIG. 15 is a flowchart showing a control process executed by the controller of the bicycle component control apparatus for deciding an operation mode of the at least one electric bicycle component based on a number of manually operated input member coupled to the controller via the communication interface.

In any case, the controller 30 decides which operation mode to use depending on the number of manually operated input members and which electric bicycle components are operatively connected to the controller 30. Referring now to FIG. 15, a flow chart illustrates a basic program that is executed by the controller 30 for determining the appropriate operation mode to use for a particular configuration of input members and components.

As seen in FIG. 15, once the controller 30 is started (e.g., powered up), the controller 30 executes a program to determine the operation mode. For example, in the flow chart of FIG. 15, the controller 30 first detects which ones of the electric bicycle components are operatively connected to the controller 30 in step S1. Then the process proceeds to step S2.

In step S2, the controller 30 determines the number of the manually operated input members that are in communication with the controller 30. If both of the first and second manually operated input members SW1 and SW2 are in communication with the controller 30, then the process proceeds to step S3. On the other hand, if only one of the first and second manually operated input members SW1 and SW2 are in communication with the controller 30, then the process proceeds to step S4.

In step S3, the controller 30 loads the one of the control programs for operating one or two of the electric bicycle components FD, RD, FS, RS and SP using two manually operated input members based on the detection results in step S1. In the case of the first embodiment, the controller 30 includes six operation modes for using two manually operated input members for controlling one or two of the electric bicycle components FD, RD, FS, RS and SP (i.e., a non-synchro-shift mode, a dual-input single shifter mode, a non-synchro-suspension mode, a dual-input single suspension mode, a non-synchro-seatpost-suspension mode and a dual-input seatpost mode). The controller 30 has a pre-stored the program for each of the operation modes. Of course, it will be apparent from this disclosure that other operation modes can be included for controlling the electric bicycle components FD, RD, FS, RS and SP. Also, it will be apparent from this disclosure that one or more of the above mentioned operation modes do not need to be included if desired.

In step S4, the controller 30 loads the one of the control programs for operating one or two of the electric bicycle components FD, RD, FS, RS and SP using a single manually operated input member based on the detection results in step S1. In the case of the first embodiment, the controller 30 includes six operation modes for controlling one or two of the electric bicycle components, FD, RD, FS, RS and SP (i.e., a synchro-shift mode, a single-input single shifter mode, a synchro-suspension mode, a single-input-single suspension mode, a synchro-seatpost-suspension mode and a single-input seatpost mode). The controller 30 has a pre-stored program for each of the operation modes.

Figure 16:
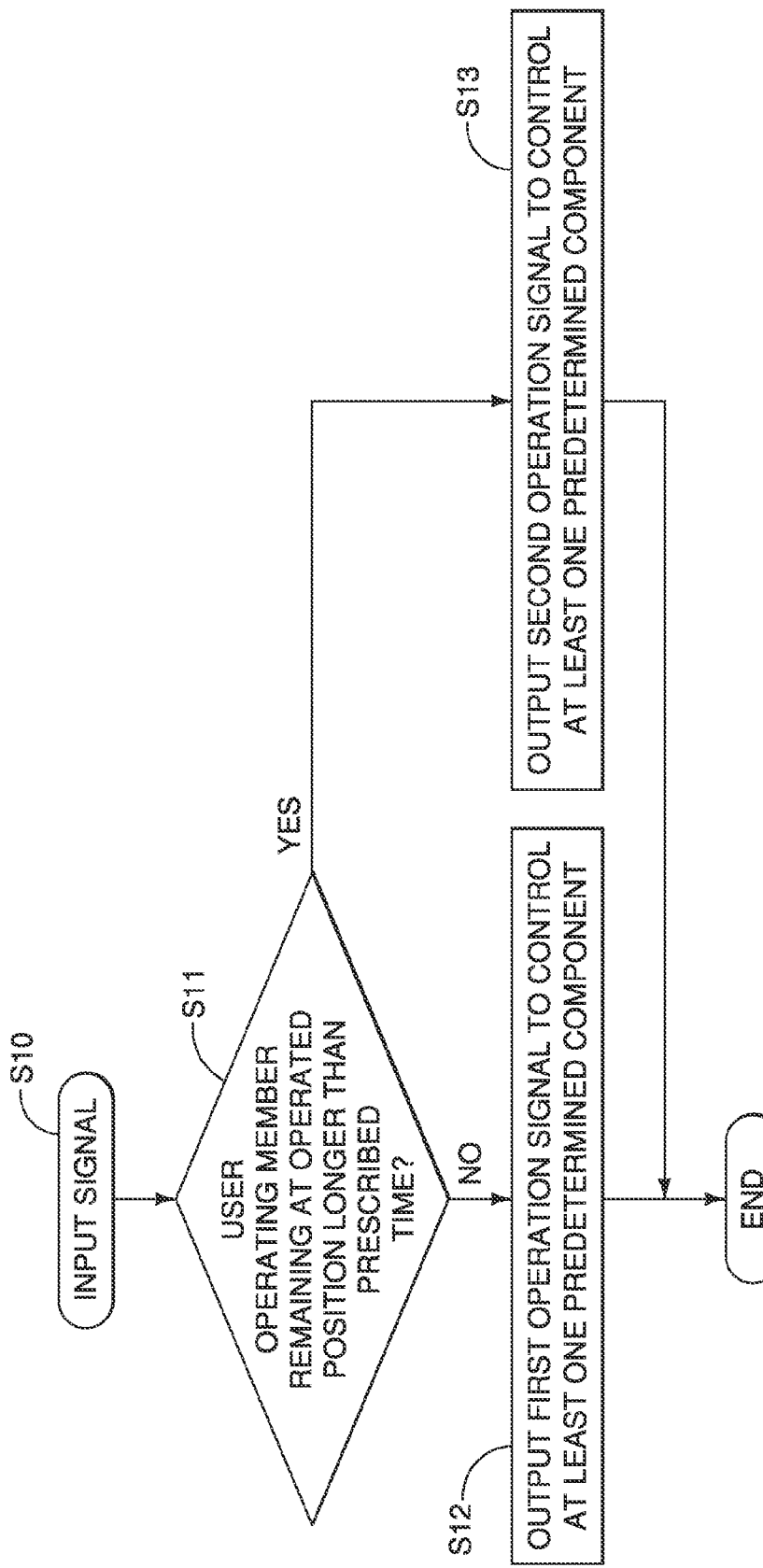
FIG. 16 is a flowchart showing a control process executed by the controller of the bicycle component control apparatus for operating the at least one electric bicycle component based the length of time that the manually operated input member is operated.

Referring to FIG. 16, one exemplary control process is illustrated that is executed by the controller 30. This control process can be adapted to control each of the electric bicycle components FD, RD, FS, RS and SP whether using only one or both of the first and second manually operated input members SW1 and SW2. Of course, other control processes can be used to control the setting or operating state of the electric bicycle component(s) FD, RD, FS, RS and SP.

In step S10, the controller 30 receives an input signal that is produced by the rider operating one of the first and second manually operated input members SW1 and SW2. Then the process proceeds to step S11.

In step S11, the controller 30 determines whether the rider has operated a user operating member (e.g., a button) of one of the first and second manually operated input members SW1 and SW2 for a period of time that is longer than a prescribed time period. In other words, in the first embodiment, the controller 30 determines whether the rider has pushed the button (e.g., a user operating member) of one of the first and second manually operated input members SW1 and SW2 for a short push or a long push. Alternatively, step S11 can be replaced with a process step(s) that determines whether the one of the first and second manually operated input members SW1 and SW2 has been operated only once or twice in a prescribed time period.

If the controller 30 determines that a short push has occurred (i.e., a "No" in step S11), then the process proceeds to step S12. On the other hand, if the controller 30 determines that a long push has occurred (i.e., a "Yes" in step S11), then the process proceeds to step S13.

In step S12, the controller 30 outputs a first operation signal to control at least one predetermined electric bicycle component in accordance with the control program that was loaded for the operation mode that corresponds to the particular setup of the bicycle component control apparatus 12.

In step S13, the controller 30 outputs a second operation signal to control at least one predetermined electric bicycle component in accordance with the control program that was loaded for the operation mode that corresponds to the particular setup of the bicycle component control apparatus 12.

After the controller 30 outputs either the first operation signal or the second operation signal, the process ends and the controller 30 waits for the rider to operate one of the first and second manually operated input members SW1 and SW2.

Now examples of the various operation modes will be presented.

In the first embodiment, FIG. 3 illustrates a first configuration for the non-synchro-shift mode. In particular, in the non-synchro-shift mode, both the first and second manually operated input members SW1 and SW2 are plugged into the communication interface 32 such that the first and second manually operated input members SW1 and SW2 are in communication with the controller 30. Also in the non-synchro-shift mode, the front derailleur FD and the rear derailleur RD are both plugged into the electrical wiring junction 46, which is electrically connected to the communication interface 32. Here, in the non-synchro-shift mode, one of the first and second manually operated input members SW1 and SW2 is used to control one of the front and rear derailleurs FD and RD, while the other one of the first and second manually operated input members SW1 and SW2 is used to control the other one of the front and rear derailleurs FD and RD. For example, the non-synchro-shift mode using the first and second manually operated input members SW1 and SW2 can be carried out as indicated in the follow Table 1.

TABLE 1

| | Short or Single Operation | Long or Double Operation |
|---|---|---|
| SW1 | Downshift RD One Shift Stage | Upshift RD One Shift Stage |
| SW2 | Downshift RD One Shift Stage | Upshift FD One Shift Stage |

In the first embodiment, FIG. 4 illustrates a second configuration for the synchro-shift mode. In particular, in the synchro-shift mode, only the first manually operated input member SW1, for example, is plugged into the communication interface 32 such that only the first manually operated input member SW1 is in communication with the controller 30. Also in the synchro-shift mode, the front derailleur FD and the rear derailleur RD are both plugged into the electrical wiring junction 46, which is electrically connected to the communication interface 32. Here, in the synchro-shift mode, the first manually operated input member SW1 is used to control both of the front and rear derailleurs FD and RD in accordance with a synchro-shift table that is stored in the memory of the controller 30. The synchro-shift table has at least one synchro-downshift route and at least one synchro-upshift route such that the front and rear derailleurs FD and RD are operated together in response to a single control signal outputted by the controller at prescribed synchro-shift points.

For example, in a drive train having a front crank (FC) with three front chainwheels and a rear cassette (CS) having ten rear sprockets, the synchro-shift mode using only the first manually operated input member SW1 can be carried out as indicated in the follow Tables 2 and 3.

TABLE 2

| | Short or Single Operation | Long or Double Operation |
|---|---|---|
| SW1 | Downshift One Shift Stage | Upshift One Shift Stage |

TABLE 3

| Synchro-shift | | | FC | | |
|---|---|---|---|---|---|
| | | | 24 | 32 | 42 |
| | Tooth | | | Tooth | |
| | Count | | | Count | |
| | | | Low | Med | Top |
| CS | 36 | 1st | 0.67 | 0.89 | |
| | 32 | 2nd | 0.75 | 1.00 | 1.31 |
| | 26 | 3rd | 0.86 | 1.14 | 1.50 |
| | 24 | 4th | 1.00 | 1.33 | 1.75 |
| | 21 | 5th | 1.14 | 1.52 | 2.00 |
| | 19 | 6th | 1.26 | 1.68 | 2.21 |
| | 17 | 7th | 1.41 | 1.88 | 2.47 |
| | 15 | 8th | 1.60 | 2.13 | 2.80 |
| | 13 | 9th | 1.85 | 2.46 | 3.23 |
| | 11 | 10th | 2.18 | 2.91 | 3.82 |

In this prestored shift table (Table 3) has prescribed shift routes indicated by the broken arrows with synchro-shift points being circled. The synchro-shift point is determined by a pair of gear ratios or a pair of the front shift stages and rear shift stages which occurs before and after the shift. In this embodiment, the synchro-points include a plurality of synchro-upshift shift points and a plurality of synchro-downshift points. The synchro-shift point is determined by a pair of gear ratios or a pair of the front shift stages and the rear shift stages which occurs before and after the shift. In this embodiment, the synchro-shift point includes a synchro-upshift point and a synchro-downshift point. In Table 3, the synchro-upshift points includes a pair of gear ratios 1.14 (i.e., where the pair is the front shift stage is the Low stage and the rear shift stage is the 5th stage) and 1.33 (i.e., where the pair is the front shift stage is the Mid stage and the rear shift stage is the 4th stage), and a pair of gear ratios 1.88 (i.e., where the pair is the front shift stage is the Mid stage and the rear shift stage is the 7th stage) and 2.21 (i.e., where the pair is the front shift stage is the Top stage and the rear shift stage is the 6th stage). In Table 3, the synchro-downshift points includes a pair of gear ratios 1.31 (i.e., where the pair is the front shift stage is the Top stage and the rear shift stage is the 2nd stage) and 1.14 (i.e., where the pair is the front shift stage is the Mid stage and the rear shift stage is the 3rd stage), and a pair of gear ratios 0.89 (i.e., where the pair is the front shift stage is the Mid stage and the rear shift stage is the 1st stage) and 0.75 (i.e., where the pair is the front shift stage is the Low stage and the rear shift stage is the 2nd stage).

Accordingly, when the rider operates the first manually operated input member SW1 with a short push or a single push to perform a downshift, a downshift synchro-shift route is followed to decrease the gear ratio in order from the last gear stage (CS: eleven teeth and FC: forty-two teeth) to the first stage (CS: thirty-six teeth and FC: twenty-four teeth). In this case, the gear ratios are changed as follow: 3.82 (CS: 10th stage and FC: Top stage)→3.23 (CS: 9th stage and FC: Top stage)→2.80 (CS: 8th stage and FC: Top stage)→2.47 (CS: 7th stage and FC: Top stage)→2.21 (CS: 6th stage and FC: Top stage)→2.00 (CS: 5th stage and FC: Top stage)→1.75 (CS: 4th stage and FC: Top stage)→1.50 (CS: 3rd stage and FC: Top stage)→1.31 (CS: 2nd stage and FC: Top stage)→1.14 (CS: 3rd stage and FC: Mid stage)→1.00 (CS: 2nd stage and FC: Mid stage)→0.89 (CS: 1st stage and FC: Mid stage)→0.75 (CS: 2nd stage and FC: Low stage)→0.67 (CS: 1st stage and FC: Low stage).

On the other hand, when the rider operates the first manually operated input member SW1 with a long push or a two quick pushes in a prescribed time period to perform an upshift, an upshift synchro-shift route is followed to increase the gear ratio in order from the first stage (CS: thirty-six teeth and FC: twenty-four teeth) to the last gear stage (CS: eleven teeth and FC: forty-two teeth). In this case, the gear ratios are changed as follow: 0.67 (CS: 1st stage and FC: Low stage)→0.75 (CS: 2nd stage and FC: Low stage)→0.86 (CS: 3rd stage and FC: Low stage)→1.00 (CS: 4th stage and FC: Low stage)→1.14 (CS: 5th stage and FC: Low stage)→1.33 (CS: 4th stage and FC: Mid stage)→1.52 (CS: 5th stage and FC: Mid stage)→1.68 (CS: 6th stage and FC: Mid stage)→1.88 (CS: 7th stage and FC: Mid stage)→2.21 (CS: 6th stage and FC: Top stage)→2.47 (CS: 7th stage and FC: Top stage)→2.80 (CS: 8th stage and FC: Top stage)→3.23 (CS: 9th stage and FC: Top stage)→3.82 (CS: 10th stage and FC: Top stage).

In the first embodiment, FIG. 5 illustrates a third configuration for the dual-input single shifter mode. In particular, in the dual-input single shifter mode, both the first and second manually operated input members SW1 and SW2 are plugged into the communication interface 32 such that the first and second manually operated input members SW1 and SW2 are in communication with the controller 30. Also in the dual-input single shifter mode, only the rear derailleur RD, for example, is plugged into the electrical wiring junction 46, which is electrically connected to the communication interface 32. Here, in the dual-input single shifter mode, one of the first and second manually operated input members SW1 and SW2 is used for downshifting of the rear derailleur RD, while the other one of the first and second manually operated input members SW1 and SW2 is used for upshifting the rear derailleur RD. For example, the dual-input single shifter mode using the first and second manually operated input members SW1 and SW2 can be carried out as indicated in the follow Table 4.

TABLE 4

| | Short or Single Operation | Long or Double Operation |
| --- | --- | --- |
| SW1 | Downshift RD One Shift Stage | Downshift RD Two Shift Stages |
| SW2 | Upshift RD One Shift Stage | Upshift FD RD Two Shift Stages |

In the first embodiment, FIG. 6 illustrates a fourth configuration for the single-input single shifter mode. In particular, in the single-input single shifter mode, only the first manually operated input member SW1, for example, is plugged into the communication interface 32 such that only the first manually operated input member SW1 is in communication with the controller 30. Also in the single-input single shifter mode, only the rear derailleur RD, for example, is plugged into the electrical wiring junction 46, which is electrically connected to the communication interface 32. Here, in the single-input single shifter mode, the first manually operated input member SW1 is used to control both upshifting and downing of the rear derailleur RD.

For example, the single-input single shifter mode using only the first manually operated input member SW1 can be carried out as indicated in the follow Table 5.

TABLE 5

| | Short or Single Operation | Long or Double Operation |
| --- | --- | --- |
| SW1 | Downshift One Shift Stage | Upshift One Shift Stage |

In the first embodiment, FIG. 7 illustrates a fifth configuration for the non-synchro-suspension mode. In particular, in the non-synchro-suspension mode, both the first and second manually operated input members SW1 and SW2 are plugged into the communication interface 32 such that the first and second manually operated input members SW1 and SW2 are in communication with the controller 30. Also in the non-synchro-suspension mode, the front and rear suspensions FS and RS are both plugged into the electrical wiring junction 46, which is electrically connected to the communication interface 32. Here, in the non-synchro-suspension mode, one of the first and second manually operated input members SW1 and SW2 is used to control one of the front and rear suspensions FS and RS, while the other one of the first and second manually operated input members SW1 and SW2 is used to control the other one of the front and rear suspensions FS and RS. For example, the non-synchro-suspension mode using the first and second manually operated input members SW1 and SW2 can be carried out as indicated in the follow Table 6 to lock the front and rear suspensions FS and RS or unlock the front and rear suspensions FS and RS.

TABLE 6

| | Short or Single Operation | Long or Double Operation |
| --- | --- | --- |
| SW1 | Unlocked (open) RS | Locked (close) RS |
| SW2 | Unlocked (open) FS | Locked (close) FS |

In the first embodiment, FIG. 8 illustrates a sixth configuration for the synchro-suspension mode. In particular, in the synchro-suspension mode, only the first manually operated input member SW1, for example, is plugged into the communication interface 32 such that only the first manually operated input member SW1 is in communication with the controller 30. Also in the synchro-suspension mode, the front and rear suspensions FS and RS are both plugged into the electrical wiring junction 46, which is electrically connected to the communication interface 32. Here, in the synchro-suspension mode, the first manually operated input member SW1 is used to control both of the front and rear suspensions FS and RS in accordance with a synchro-suspension sequence that is stored in the memory of the controller 30. For example, the synchro-suspension mode using only the first manually operated input member SW1 can be carried out as indicated in the follow Table 7.

TABLE 7

|    | State 1          | State 2       | State 3        | State 4       |
|----|------------------|---------------|----------------|---------------|
| FS | Unlocked (open)  | Locked (close)| Unlocked (open)| Locked (close)|
| RS | Locked (close)   | Unlocked (open)| Unlocked (open)| Locked (close)|

In the synchro-suspension mode, the controller 30 change the suspension state from the state 1 to the state 4 in a prescribed sequence each time that the controller 30 receives input from the first manually operated input member SW1. While only four states of the synchro-suspension mode are shown, it will be apparent that more states are possible if needed and/or desired. For example, the stiffness of each of the front and rear suspensions FS and RS can be coordinated into states that are added to the prescribed sequences such that the rider can select a desired for each of the front and rear suspensions FS and RS.

In the first embodiment, FIG. 9 illustrates a seventh configuration for the dual-input-single suspension mode. In particular, in the dual-input-single suspension mode, both the first and second manually operated input members SW1 and SW2 are plugged into the communication interface 32 such that the first and second manually operated input members SW1 and SW2 are in communication with the controller 30. Also in the dual-input-single suspension mode, the front suspension FS, for example, is plugged into the electrical wiring junction 46, which is electrically connected to the communication interface 32. Here, in the dual-input-single suspension mode, one of the first and second manually operated input members SW1 and SW2 is used to lock or increase the stiffness of the front suspension FS, while the other one of the first and second manually operated input members SW1 and SW2 is used to unlock or decrease the stiffness of the front suspension FS. For example, the dual-input-single suspension using the first and second manually operated input members SW1 and SW2 can be carried out as indicated in the follow Table 8 to lock or unlock the front suspension FS.

TABLE 8

|     | Short or Single Operation | Long or Double Operation   |
|-----|---------------------------|----------------------------|
| SW1 | Locked (close) FS         | Increase Stiffness of FS   |
| SW2 | Unlocked (open) FS        | Decrease Stiffness of FS   |

In the first embodiment, FIG. 10 illustrates an eighth configuration for the single-input-single suspension mode. In particular, in the single-input-single suspension mode, only the first manually operated input member SW1, for example, is plugged into the communication interface 32 such that only the first manually operated input member SW1 is in communication with the controller 30. Also in the single-input-single suspension mode, the front suspension FS is plugged into the electrical wiring junction 46, which is electrically connected to the communication interface 32. Here, in the single-input-single suspension mode, the first manually operated input member SW1 is used to control the front suspension FS between different operating states depending on the type of operation performed by the rider. For example, the single-input-single suspension mode using only the first manually operated input member SW1 can be carried out as indicated in the follow Table 9.

TABLE 9

|     | Short or Single Operation        | Long or Double Operation                       |
|-----|----------------------------------|------------------------------------------------|
| SW1 | Toggles Between Locked and Unlocked | Toggles Between Increasing and Decreasing Stiffness |

In the first embodiment, FIG. 11 illustrates a ninth configuration for the non-synchro-seatpost-suspension mode. In particular, in the non-synchro-suspension mode, both the first and second manually operated input members SW1 and SW2 are plugged into the communication interface 32 such that the first and second manually operated input members SW1 and SW2 are in communication with the controller 30. Also in the non-synchro-seatpost-suspension mode, the front suspension FS and the adjustable seatpost SP are both plugged into the electrical wiring junction 46, which is electrically connected to the communication interface 32. Here, in the non-synchro-seatpost-suspension, one of the first and second manually operated input members SW1 and SW2 is used to control one of the front suspension FS and the adjustable seatpost SP, while the other one of the first and second manually operated input members SW1 and SW2 is used to control the other one of the front suspension FS and the adjustable seatpost SP. For example, the non-synchro-seatpost-suspension using the first and second manually operated input members SW1 and SW2 can be carried out as indicated in the follow Table 10 to set operating states of the front suspension FS and the adjustable seatpost SP.

TABLE 10

|     | Short or Single Operation | Long or Double Operation   |
|-----|---------------------------|----------------------------|
| SW1 | Raise seat S (Extend SP)  | Lower seat S (Retract SP)  |
| SW2 | Unlocked (open) FS        | Locked (close) FS          |

In the first embodiment, FIG. 12 illustrates a tenth configuration for the synchro-seatpost-suspension mode. In particular, in the synchro-seatpost-suspension mode, only the first manually operated input member SW1, for example, is plugged into the communication interface 32 such that only the first manually operated input member SW1 is in communication with the controller 30. Also in the synchro-seatpost-suspension mode, the front suspension FS and the adjustable seatpost SP are both plugged into the electrical wiring junction 46, which is electrically connected to the communication interface 32. Here, in the synchro-seatpost-suspension mode, the first manually operated input member SW1 is used to control both of the front suspension FS and the adjustable seatpost SP in accordance with a synchro-seatpost-suspension sequence that is stored in the memory of the controller 30. For example, the synchro-seatpost-suspension mode using only the first manually operated input member SW1 can be carried out as indicated in the follow Table 11.

TABLE 11

|  | State 1 | State 2 | State 3 | State 4 |
|---|---|---|---|---|
| SP | Top Position | Middle Position | Middle Position | Bottom Position |
| FS | Locked (close) | Locked (close) | Unlocked (open) | Unlocked (open) |

In the synchro-seatpost-suspension mode, the controller 30 change the suspension state from the state 1 to the state 4 in a prescribed sequence each time that the controller 30 receives input from the first manually operated input member SW1. While only four states of the synchro-seatpost-suspension mode are shown, it will be apparent that more states are possible if needed and/or desired.

In the first embodiment, FIG. 13 illustrates an eleventh configuration for the dual-input seatpost mode. In particular, in the dual-input seatpost mode, both the first and second manually operated input members SW1 and SW2 are plugged into the communication interface 32 such that the first and second manually operated input members SW1 and SW2 are in communication with the controller 30. Also in the dual-input seatpost mode, only the adjustable seatpost SP is plugged into the electrical wiring junction 46, which is electrically connected to the communication interface 32. Here, in the dual-input seatpost mode, one of the first and second manually operated input members SW1 and SW2 is used to increase the height of the seat S by extending the adjustable seatpost SP, while the other one of the first and second manually operated input members SW1 and SW2 is used to decrease the height of the seat S by retracting the adjustable seatpost SP. For example, the dual-input seatpost using the first and second manually operated input members SW1 and SW2 can be carried out as indicated in the follow Table 12 to adjust a setting of the adjustable seatpost SP.

TABLE 12

|  | Short or Single Operation | Long or Double Operation |
|---|---|---|
| SW1 | Raise seat S (Extend SP) | Raise seat S to Top Position |
| SW2 | Lower seat S (Retract SP) | Lower seat S to Bottom Position |

In the first embodiment, FIG. 14 illustrates a twelfth configuration for the single-input seatpost mode. In particular, in the single-input seatpost mode, only the first manually operated input member SW1, for example, is plugged into the communication interface 32 such that only the first manually operated input member SW1 is in communication with the controller 30. Also in the single-input seatpost mode, only the adjustable seatpost SP is plugged into the electrical wiring junction 46, which is electrically connected to the communication interface 32. Here, in the single-input-single suspension mode, the first manually operated input member SW1 is used to adjust the height of the seat S by extending or retracting the adjustable seatpost SP depending on the type of operation performed by the rider. For example, the single-input seatpost mode using only the first manually operated input member SW1 can be carried out as indicated in the follow Table 13.

TABLE 13

|  | Short or Single Operation | Long or Double Operation |
|---|---|---|
| SW1 | Raise seat S (Extend SP) | Lower seat S (Retract SP) |

As seen in FIGS. 17 to 20, the structure of the bicycle component control apparatus 12 is diagrammatically illustrated. In the first embodiment, power line communication technology is used for communicating between a plurality of electric devices (i.e., the first manually operated input members SW1 and SW2 and the electric bicycle components FD, RD, FS, RS and SP). Power line communication (PLC) carries data on a conductor that is also used simultaneously for electric power transmission or electric power distribution to the electric component. Power line communication uses unique identifying information such as a unique identifier that is assigned to each of the electric devices (i.e., the first manually operated input members SW1 and SW2 and the electric bicycle components FD, RD, FS, RS and SP). Preferably, each of the electric devices (i.e., the first manually operated input members SW1 and SW2 and the electric bicycle components FD, RD, FS, RS and SP) is provided with a memory from which information stored by communications can be read and in which the unique identifying information is stored.

Figure 17:
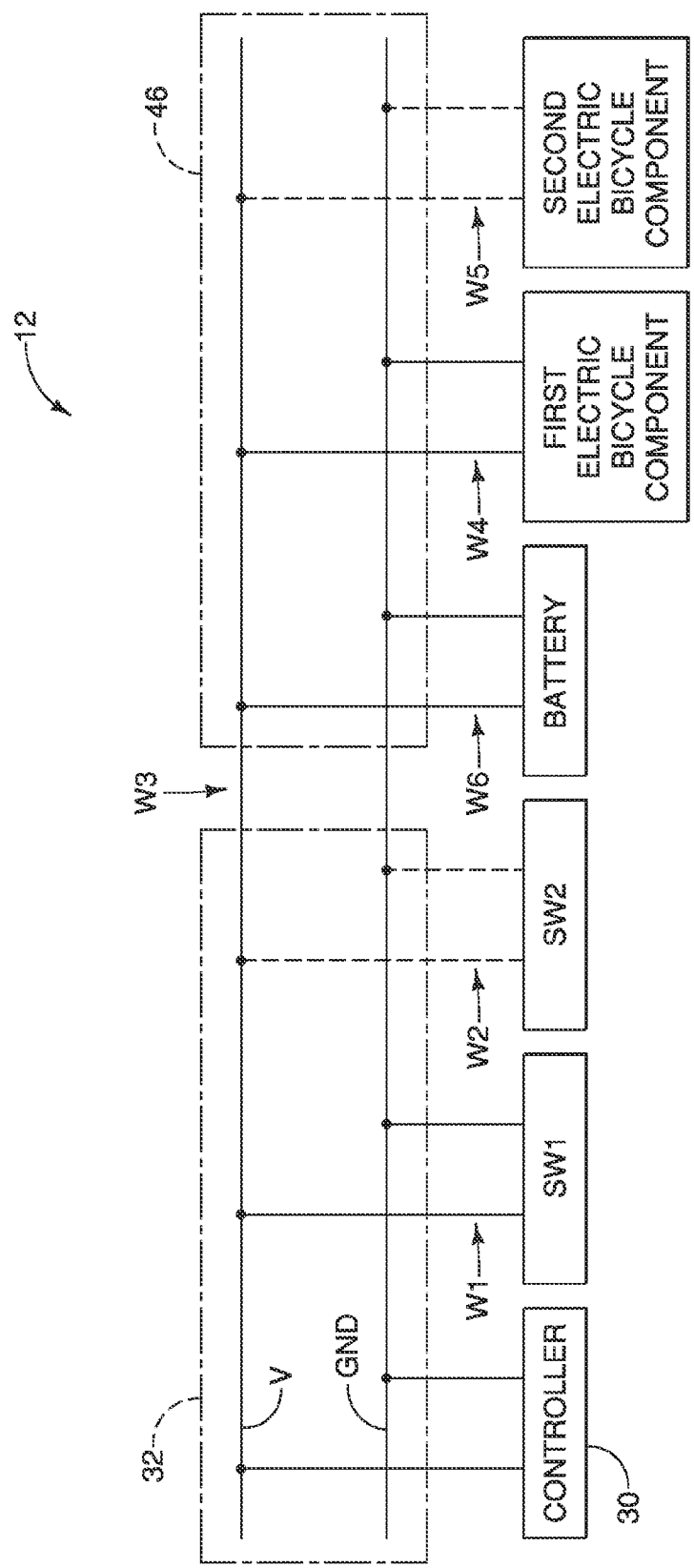
FIG. 17 is a block diagram showing an electric component connection structure of the bicycle component control apparatus in which the controller, the manually operated input members and the electric bicycle components are electrically connected together and communicate using power line communication (PLC) in accordance with the first embodiment.

Referring to FIG. 17, a basic wiring configuration of the bicycle component control apparatus 12 is illustrated. Each of the electric power lines W1 to W6 includes a ground line GND and a power or voltage line V that are detachably connected to a serial bus that is formed by the communication interface 32 and the electrical wiring junction 46. The first and second manually operated input members SW1 and SW2 and the first and second electric bicycle components (e.g., two of FD, RD, FS, RS and SP) can all communicate with the controller 30 through the power voltage line V. Thus, the controller 30 is configured to receive an input signal from the at least one manually operated input member via the communication interface 32 by power line communication.

Figure 18:
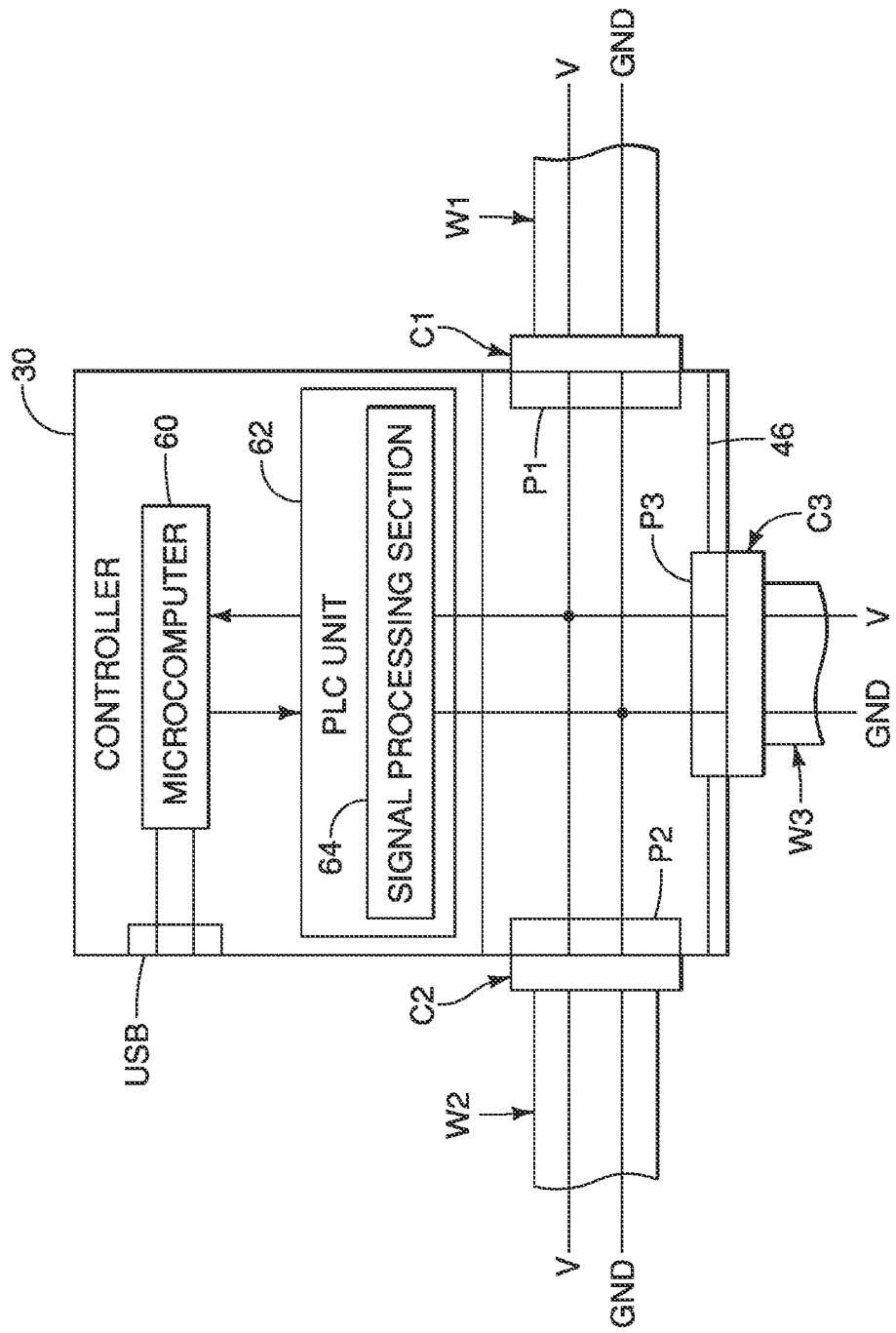
FIG. 18 is a schematic block diagram showing a basic configuration of the controller of the bicycle component control apparatus in accordance with the first embodiment.

Referring to now FIG. 18, a schematic block diagram is illustrated that shows a basic configuration of the controller 30. The controller 30 is includes a main microcomputer 60 and a power line communication (PLC) unit 62 that includes a signal processing section 64. The power line communication unit 62 is connected to the power supply B for receiving electric power as mentioned above. The power line communication unit 62 is part of a power line communication (PLC) system that is configured to execute two-way communications with each of the electric bicycle components FD, RD, FS, RS and SP, and each of the first and second manually operated input members SW1 and SW2 through the power lines W1 to W6. Thus, control signals or commands that control the electric bicycle components FD, RD, FS, RS and SP are superimposed on the power source voltage flowing in the electric power lines W1 to W6 that interconnect the controller 30, the electric bicycle components FD, RD, FS, RS and SP and the first and second manually operated input members SW1 and SW2. In this way, data can be transmitted between the controller 30 and the electric bicycle components FD, RD, FS, RS and SP. Optionally, instead of using power line communications (PLC), in addition to a ground wire GND and a voltage wire V, separate signal wires can be provided for transmitting data as needed and/or desired as discussed below.

The main microcomputer 60 includes control circuits with one or more CPUs, storage units, computation units and the like. The main microcomputer 60 also includes software that outputs the predetermined control parameters in accordance with adjustment signals outputted from the first and second manually operated input members SW1 and SW2. In particular, using the signal processing section 62, the main microcomputer 60 outputs predetermined control parameters output based on the operation of the first and second manually operated input members SW1 and SW2 to control one or two of the electric bicycle components FD, RD, FS, RS and SP in accordance with adjustment signals outputted from the first and second manually operated input members SW1 and SW2.

Figure 19:
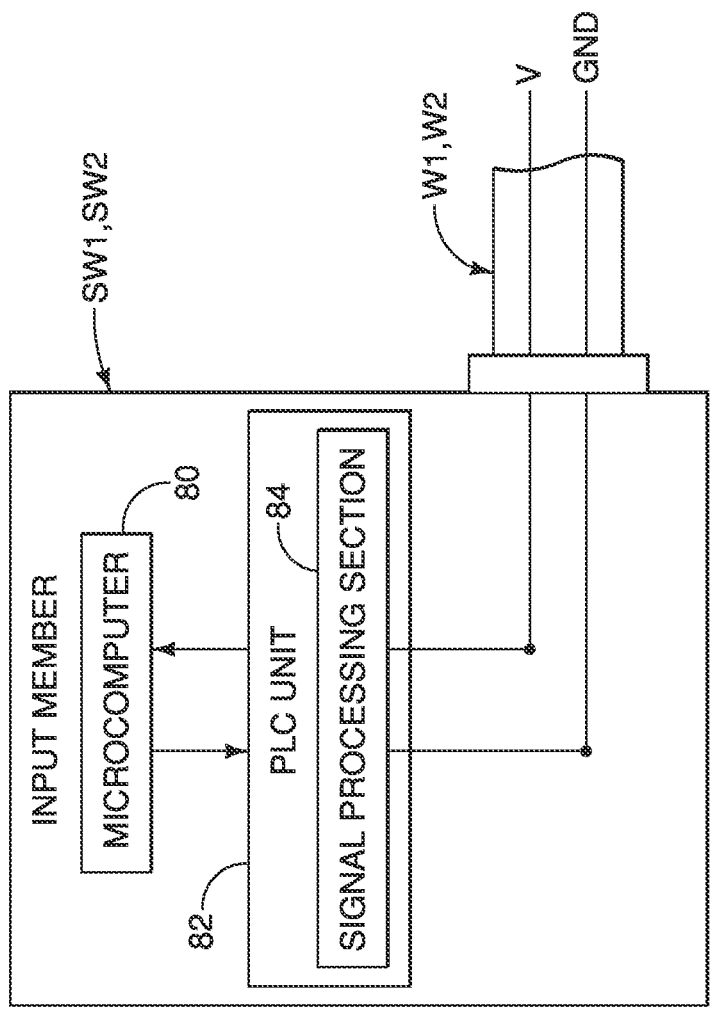
FIG. 19 is a schematic block diagram showing a basic configuration of each of the manually operated input members of the bicycle component control apparatus in accordance with the first embodiment.

Referring to now FIG. 19, the basic configuration of the controlling part of each of the first and second manually operated input members SW1 and SW2 will now be discussed. The mechanical structures of the first and second manually operated input members SW1 and SW2 are well known in the bicycle field. For this reason, the mechanical structures of the first and second manually operated input members SW1 and SW2 are not illustrated and/or discussed in detail herein. Each of the first and second manually operated input members SW1 and SW2 is basically provided with a microcomputer 70, a power line communication (PLC) unit 72 that includes a signal processing section 74. The power line communication unit 72 is connected to the power supply B for receiving electric power. The signal processing section 74 can be integrated into the microcomputer 70 or a separate component as needed and/or desired. The switches 84 and 86 can be any type of switches. Moreover, while each of the input devices 26, 28, 30, 32 and 34 is illustrated as including two switches, it will be apparent that more or less switches can be provided as needed and/or desired. Also, the switch 84 can be configured using the mode switches 51, 52 and 53 such that the switch 84 can simultaneously operate two or more of the electric bicycle components FD. RD, FS, RS and SP with a single input signal as needed and/or desired.

Figure 20:
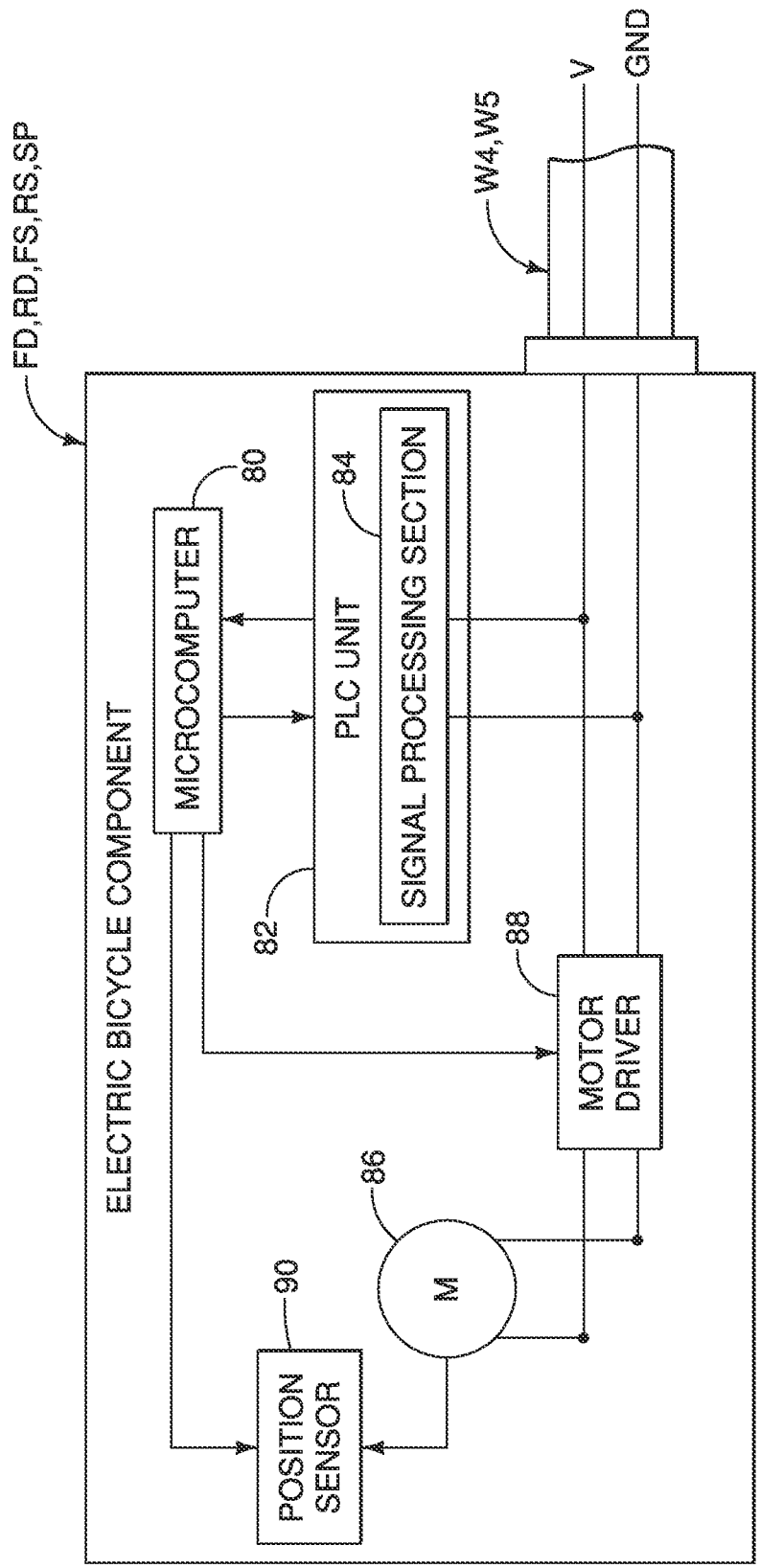
FIG. 20 is a schematic block diagram showing a basic configuration of each of the electric bicycle components of the bicycle component control apparatus in accordance with the first embodiment.

Referring to now FIG. 20, the basic configuration of the controlling part of each of the electric bicycle components FD, RD, FS, RS and SP will now be discussed. The mechanical structures of the electric bicycle components FD, RD, FS, RS and SP are well known in the bicycle field. For this reason, the mechanical structures of the electric bicycle components FD, RD, FS, RS and SP are not illustrated and/or discussed in detail herein. Each of the electric bicycle components FD, RD, FS, RS and SP is basically provided with a microcomputer 80 and a power line communication (PLC) unit 82 that includes a signal processing section 84.

Each of the electric bicycle components FD, RD, FS, RS and SP is also provided with an actuator 86, an actuator driver 88 and a position sensor 80. The actuator 86 is a reversible motor that is configured and arranged to drive a valve, a like or the like of the electric bicycle component. While the actuator 86 is illustrated as a motor in the illustrated embodiments, the actuator 86 can be other types of devices such as a solenoid. The actuator 86 adjusts the position of a part to set a state of the electric bicycle component, e.g., a lockout state, a damping rate state, a travel-stroke length state, a gear position, a seatpost height position state etc. The actuator driver 88 drives the actuator 86 in response to control signals from the microcomputer 80. The actuator driver 88 includes motor drivers and deceleration units for driving and decelerating the rotation of the actuator 86. The position sensor 80 detects the position of the actuator 86 or other part of the electric bicycle component that is indicative its current setting position or state. The microcomputer 80 is configured and arranged to control the actuator driver 88 in response to an adjustment signal from the input device for that electric bicycle component via the controller 30. The microcomputer 80 includes software that controls the actuator 86 in accordance with adjustment signals outputted from the controller 30 due to operation of the first and second manually operated input members SW1 and SW2.

Figure 21:
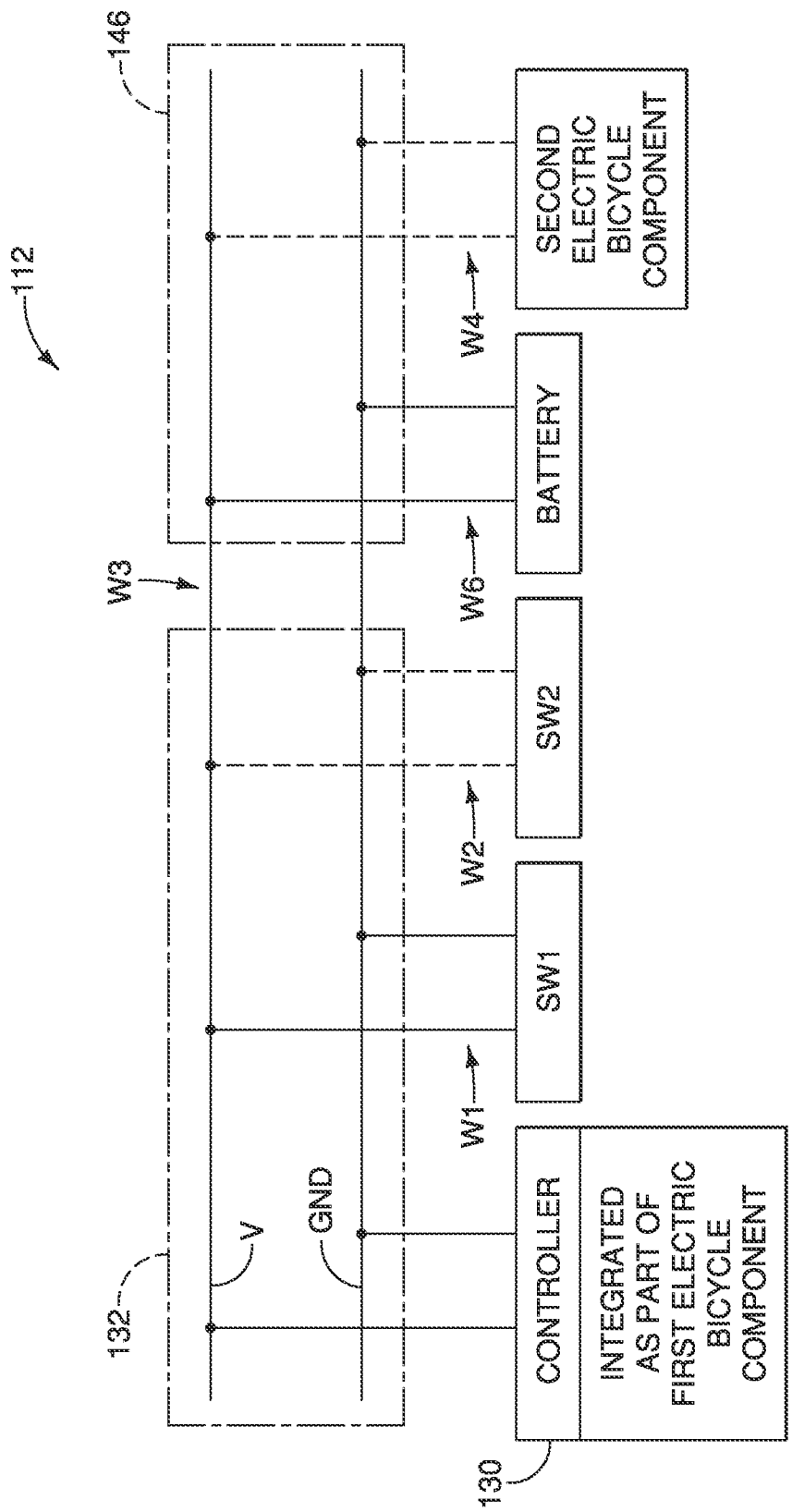
FIG. 21 is a block diagram showing an electric component connection structure of the bicycle component control apparatus in which the controller is a part of an electric bicycle component, and the manually operated input members and the electric bicycle components are electrically connected together and communicate using power line communication (PLC) in accordance with a second embodiment.

Referring to now FIG. 21, a basic wiring configuration of a bicycle component control apparatus 112 is illustrated in accordance with a second embodiment. Here, the bicycle component control apparatus 112 is identical to the bicycle component control apparatus 12, as discussed above, except that the controller is disposed on one of the at least one electric bicycle component, instead of the controller 30 being separate and remote from the at least one electric bicycle component as in the first embodiment. Thus, the bicycle component control apparatus 112 basically includes a controller 130 and a communication interface 132 that is identical to the controller 130 and the communication interface 132 of the first embodiment, except that the controller 130 is integrated into one of the electric bicycle components FD, RD, FS, RS and SP. Here, in the second embodiment, an electrical wiring junction 146 is used that is identical to the electrical wiring junction 46 of the first embodiment, except that the electrical wiring junction 146 has only one port for plugging in one the electric bicycle components (i.e., the electrical wiring junction 146 has three total ports instead of four total ports). In any case, the controller 130 decides which operation mode to use depending on the number of manually operated input members and which electric bicycle components are operatively connected to the controller 130. The operation modes are the same as the ones discussed above with respect to the first embodiment.

Figure 22:
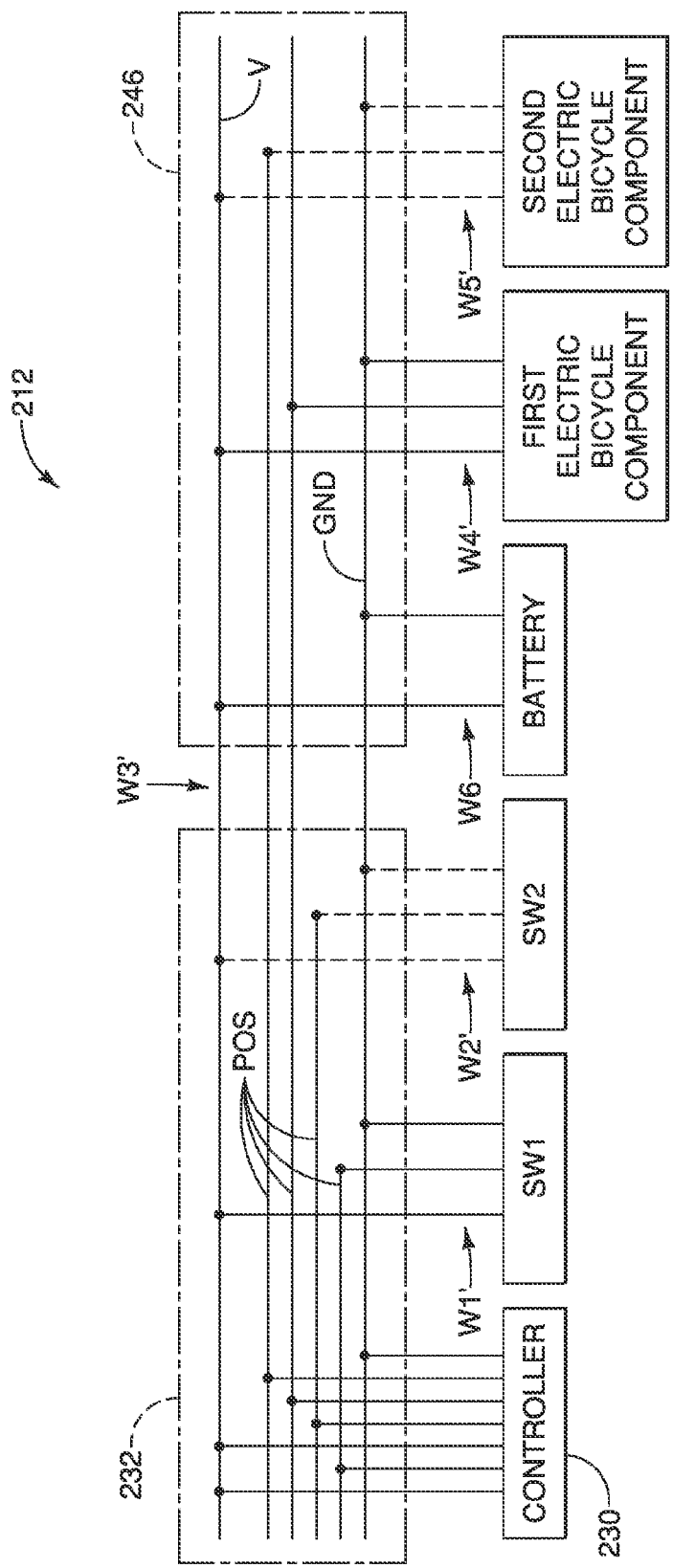
FIG. 22 is a block diagram showing an electric component connection structure of the bicycle component control apparatus in which the controller, the manually operated input members and the electric bicycle components are electrically connected together and communicate using a dedicated signal wire in accordance with a third embodiment.

Referring to now FIG. 22, a basic wiring configuration of a bicycle component control apparatus 212 is illustrated in accordance with a third embodiment. Here, the bicycle component control apparatus 212 is identical to the bicycle component control apparatus 12, as discussed above, except that dedicated signal lines POS are used in each of electric power lines W1' to W5' for the first and second manually operated input members SW1 and SW2 and the first and second electric bicycle components (e.g., two of FD, RD, FS, RS and SP) to communicate with the controller 230. In other words, the controller 30 is connected to the first and second manually operated input members SW1 and SW2 and the first and second electric bicycle components (e.g., two of FD, RD, FS, RS and SP) by electric power lines W1' to W5', which each includes at least one dedicated signal wire POS in addition to the ground line GND and the voltage line V. In any case, the controller 230 decides which operation mode to use depending on the number of manually operated input members and which electric bicycle components are operatively connected to the controller 230. The operation modes are the same as the ones discussed above with respect to the first embodiment.

Figure 23:
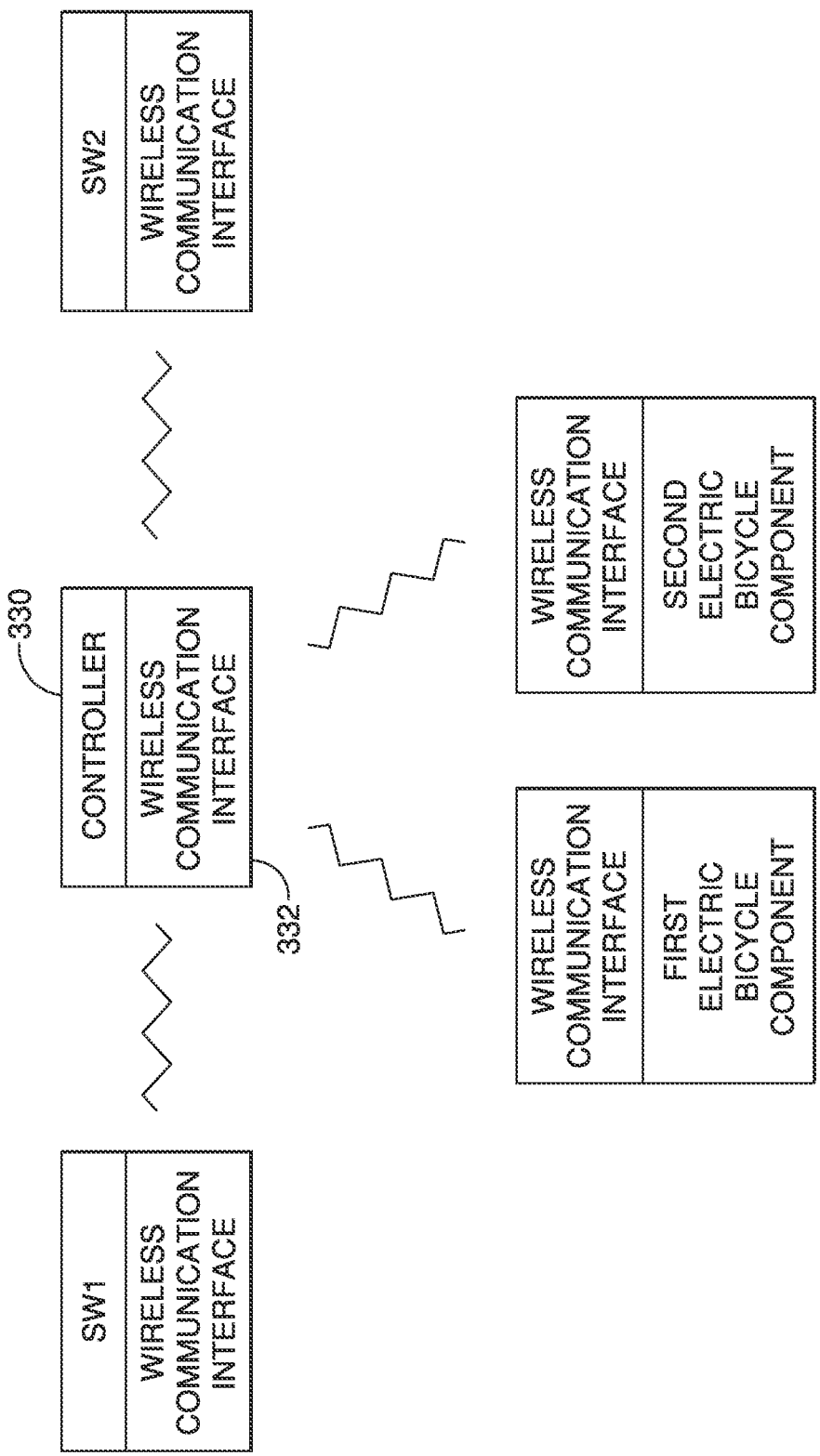
FIG. 23 is a block diagram showing an electric component connection structure of the bicycle component control apparatus in which the controller, the manually operated input members and the electric bicycle components wirelessly communicate in accordance with a fourth embodiment.

Referring to now FIG. 23, a bicycle component control apparatus 312 is illustrated in accordance with a third embodiment, which uses wireless communication. Here, the bicycle component control apparatus 312 includes a controller 330 and a wireless communication interface 332 that operate in the same manner as the controller 30 and the communication interface 32, discussed above, except that wireless communication is used instead of the electric power lines W1 to W6 and each component is provided with its own power source. Thus, each of the first and second manually operated input members SW1 and SW2 and each of the electric bicycle components FD, RD, FS, RS and SP includes a wireless communication interface that conducts two-way communication with the wireless communication interface 332 in order to communicate with the controller 330.

Preferably, the wireless communication interface 332 automatically detects and establishes wireless communication with the first and second manually operated input members SW1 and SW2 when the first and second manually operated input members SW1 and SW2 are within communication range (e.g., two meters) of the wireless communication interface 332. Thus, the controller 330 is configured to receive an input signal from the at least one manually operated input member via the communication interface 332 by wireless communication. In other words, the controller 330 is configured to receive input signals from one or both of the first and second manually operated input members SW1 and SW2 such that the controller 330 can operate one or two electric bicycle components in the same manner as the first embodiment as discussed above.

Preferably, when the electric bicycle components (e.g., FD, RD, FS, RS and SP) are within communication range (e.g., two meters) of the wireless communication interface 332, the wireless communication interface 332 automatically detects the electric bicycle components (e.g., FD, RD, FS, RS and SP) and establishes wireless communication with the two of the electric bicycle components (e.g., FD, RD, FS, RS and SP). Also preferably, the rider can manually disconnect and connect the electric bicycle components and/or the first and second manually operated input members SW1 and SW2 that are within communication range of the controller 330. In any case, the controller 330 decides which operation mode to use depending on the number of manually operated input members and which electric bicycle components are operatively connected to the controller 330. The operation modes are the same as the ones discussed above with respect to the first embodiment.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein, the following directional terms "forward", "rearward", "front", "rear", "above", "downward", "vertical", "horizontal", "below" and "transverse" as well as any other similar directional terms refer to those directions of a bicycle in an upright, riding position and equipped with the bicycle component control apparatus 12. Accordingly, these directional terms, as utilized to describe the bicycle component control apparatus 12 should be interpreted relative to a bicycle in an upright riding position on a horizontal surface and that is equipped with the bicycle component control apparatus 12. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially affect their intended function. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component control apparatus comprising:
    a communication interface configured to communicate with at least one electric bicycle component and at least one manually operated input member;
    a controller electrically coupled to the communication interface, and programmed to control the at least one electric bicycle component based on operation of the at least one manually operated input member,
    the controller being programmed to decide an operation mode of the at least one electric bicycle component differently based on a number of the manually operated input members coupled to the controller via the communication interface.

2. The bicycle component control apparatus of claim 1, wherein
    the controller is programmed to control the operation of at least one transmission as one of the at least one electric bicycle component.

3. The bicycle component control apparatus of claim 2, wherein
    the controller is programmed to control a front transmission of the at least one transmission based on an input from a first manually operated input member of the at least one manually operated input member and to control a rear transmission of the at least one transmission based on an input from a second manually operated input member of the at least one manually operated input member, while the first and second manually operated input members are coupled to the controller via the communication interface, and
    the controller is programmed to control the front and rear transmissions based on an input from one of the first and second manually operated input members while only the one of the first and second manually operated input members is coupled to the controller via the communication interface.

4. The bicycle component control apparatus of claim 2, wherein
    the controller is programmed to control the at least one transmission based on inputs from first and second manually operated input members of the at least one manually operated input member, while the first and second manually operated input members are coupled to the controller via the communication interface, and
    the controller is programmed to control the at least one transmission based on an input from one of the first and second manually operated input members while only the one of the first and second manually operated input members is coupled to the controller via the communication interface.

5. The bicycle component control apparatus of claim 1, wherein
    the controller is programmed to control the operation of at least one suspension as one of the at least one electric bicycle component.

6. The bicycle component control apparatus of claim 5, wherein
the controller is programmed to control a front suspension of the at least one suspension based on an input from a first manually operated input member of the at least one manually operated input member, and to control a rear suspension of the at least one suspension based on an input from a second manually operated input member of the at least one manually operated input member, while the first and second manually operated input members are coupled to the controller via the communication interface, and
the controller is programmed to control the front and rear suspensions based on an input from one of the first and second manually operated input members while only the one of the first and second manually operated input members is coupled to the controller via the communication interface.

7. The bicycle component control apparatus of claim 5, wherein
the controller is programmed to control the at least one suspension based on inputs from first and second manually operated input members of the at least one manually operated input member, while the first and second manually operated input members are coupled to the controller via the communication interface, and
the controller is programmed to control the at least one suspension based on an input from one of the first and second manually operated input members while only the one of the first and second manually operated input members is coupled to the controller via the communication interface.

8. The bicycle component control apparatus of claim 1, wherein
the controller is programmed to control the operation of an adjustable seatpost as one of the at least one electric bicycle component.

9. The bicycle component control apparatus of claim 8, wherein
the controller is programmed to control the adjustable seatpost based on inputs from first and second manually operated input members of the at least one manually operated input member, while the first and second manually operated input members are coupled to the controller via the communication interface, and
the controller is programmed to control the adjustable seatpost based on an input from one of the first and second manually operated input members while only the one of the first and second manually operated input members is coupled to the controller via the communication interface.

10. The bicycle component control apparatus of claim 1, wherein
the controller is programmed to control a first electric bicycle component of the at least one electric bicycle component based on an input from a first manually operated input member of the at least one manually operated input member, and to control a second electric bicycle component of the at least one electric bicycle component based on an input from a second manually operated input member of the at least one manually operated input member, while the first and second manually operated input members are coupled to the controller via the communication interface, and
the controller is programmed to control the first and second electric bicycle components based on an input from one of the first and second manually operated input members when only the one of the first and second manually operated input members is coupled to the controller via the communication interface.

11. The bicycle component control apparatus of claim 10, wherein
the controller is programmed to control the operation of a seatpost as the first electric bicycle component, and to control the operation of at least one suspension as the second electric bicycle component.

12. The bicycle component control apparatus of claim 1, wherein
the communication interface is configured to be electrically connected by an electric wire to the at least one manually operated input member.

13. The bicycle component control apparatus of claim 12, wherein
the controller is configured to receive an input signal from the at least one manually operated input member via the communication interface by power line communication.

14. The bicycle component control apparatus of claim 1, wherein
the controller is configured to receive an input signal from the at least one manually operated input member via the communication interface by wireless communication.

15. The bicycle component control apparatus of claim 1, wherein
the controller is disposed on one of the at least one electric bicycle component.

16. The bicycle component control apparatus of claim 1, wherein
the controller is separate and remote from the at least one electric bicycle component.

17. A bicycle component control apparatus comprising:
at least one manually operated input member;
at least one electric bicycle component;
a communication interface configured to communicate with the at least one electric bicycle component and at least one manually operated input member; and
a controller electrically coupled to the communication interface, and programmed to control the at least one electric bicycle component based on operation of the at least one manually operated input member,
the controller being programmed to decide an operation mode of the at least one electric bicycle component differently based on a number of the manually operated input members coupled to the controller.

* * * * *